(12) United States Patent
Utz

(10) Patent No.: US 10,959,370 B2
(45) Date of Patent: Mar. 30, 2021

(54) SEED PLANTER TRANSFER UNIT

(71) Applicant: AGCO International GmbH, Neuhausen (CH)

(72) Inventor: Johannes Utz, Marktoberdorf (DE)

(73) Assignee: AGCO International GmbH, Neuhausen (CH)

( * ) Notice: Subject to any disclaimer, the term of this patent is extended or adjusted under 35 U.S.C. 154(b) by 0 days.

(21) Appl. No.: 16/762,455

(22) PCT Filed: Oct. 17, 2018

(86) PCT No.: PCT/EP2018/078400
§ 371 (c)(1),
(2) Date: May 7, 2020

(87) PCT Pub. No.: WO2019/091730
PCT Pub. Date: May 16, 2019

(65) Prior Publication Data
US 2020/0375088 A1 Dec. 3, 2020

(30) Foreign Application Priority Data
Nov. 9, 2017 (GB) .................................... 1718536

(51) Int. Cl.
*A01C 7/20* (2006.01)

(52) U.S. Cl.
CPC .................................... *A01C 7/208* (2013.01)

(58) Field of Classification Search
CPC .. A01C 7/208; A01C 7/20; A01C 7/00; A01C 7/128; A01C 7/127; A01C 7/126;
(Continued)

(56) References Cited

U.S. PATENT DOCUMENTS

| 5,799,598 A | 9/1998 | Stufflebeam |
| 2017/0020060 A1 | 1/2017 | Gentili |

FOREIGN PATENT DOCUMENTS

| DE | 10 2015 114155 A1 | 3/2017 |
| EP | 2 974 584 A1 | 1/2016 |

(Continued)

OTHER PUBLICATIONS

UK Intellectual Property Office, Search Report for related UK Application No. GBI718536.4, dated May 8, 2018.
(Continued)

*Primary Examiner* — Christopher J. Novosad

(57) ABSTRACT

A seed transfer unit for an agricultural planter, having first and second transfer bodies, with each having a plate with a cylindrical sidewall extending perpendicularly. The first and second plates are mounted to permit relative rotation therebetween about a device axis coincident with the major axes through the first and second cylindrical side walls, with the first and second plates parallel, and with the second cylindrical side wall disposed within, and concentric with, the first cylindrical side wall, such that the first and second plates and first and second cylindrical side walls define an annular space therebetween. The first plate has an inlet aperture through which a seed may pass to the annular space, and the second plate has at least one outlet aperture through which a seed is ejected. Each of the first and second plates has at least one arcuate ridge portion concentric with the respective cylindrical side wall and extending into the annular space, which ridge portions cooperate to carry a seed through the annular space from the inlet aperture to the, or one of the, outlet apertures as the first and second plates rotate relative to one another.

12 Claims, 20 Drawing Sheets

(58) Field of Classification Search
CPC .... A01C 7/12; A01C 7/10; A01C 7/08; A01C 7/124; A01C 7/125; A01C 7/122; A01C 7/121
See application file for complete search history.

(56) References Cited

FOREIGN PATENT DOCUMENTS

| | | |
|---|---|---|
| EP | 3 135 088 A1 | 3/2017 |
| WO | 2016/087535 A1 | 6/2016 |

OTHER PUBLICATIONS

European Patent Office, International Serch Report for related International Patent Application No. PCT/EP2018/078400, dated Jan. 21, 2019.

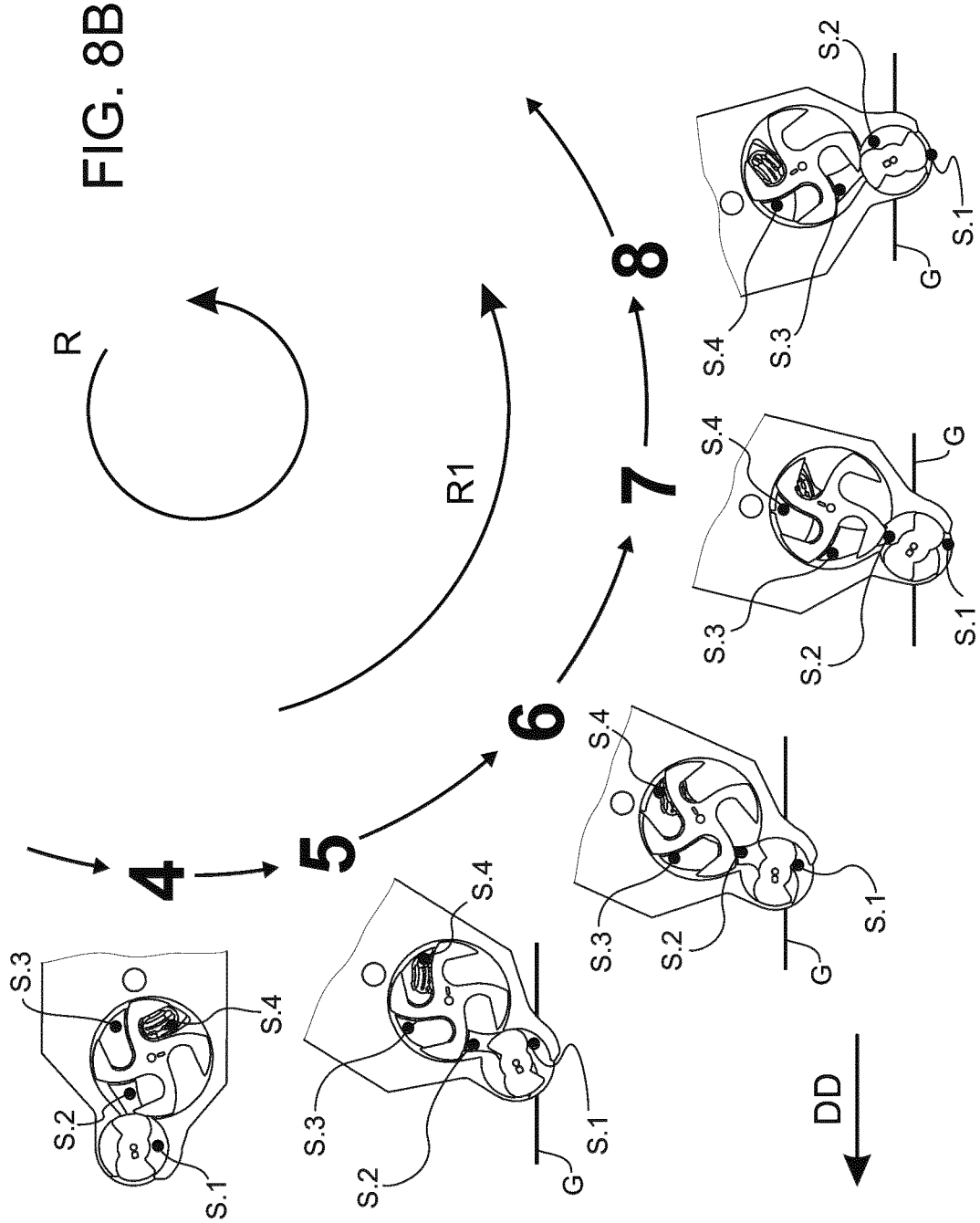

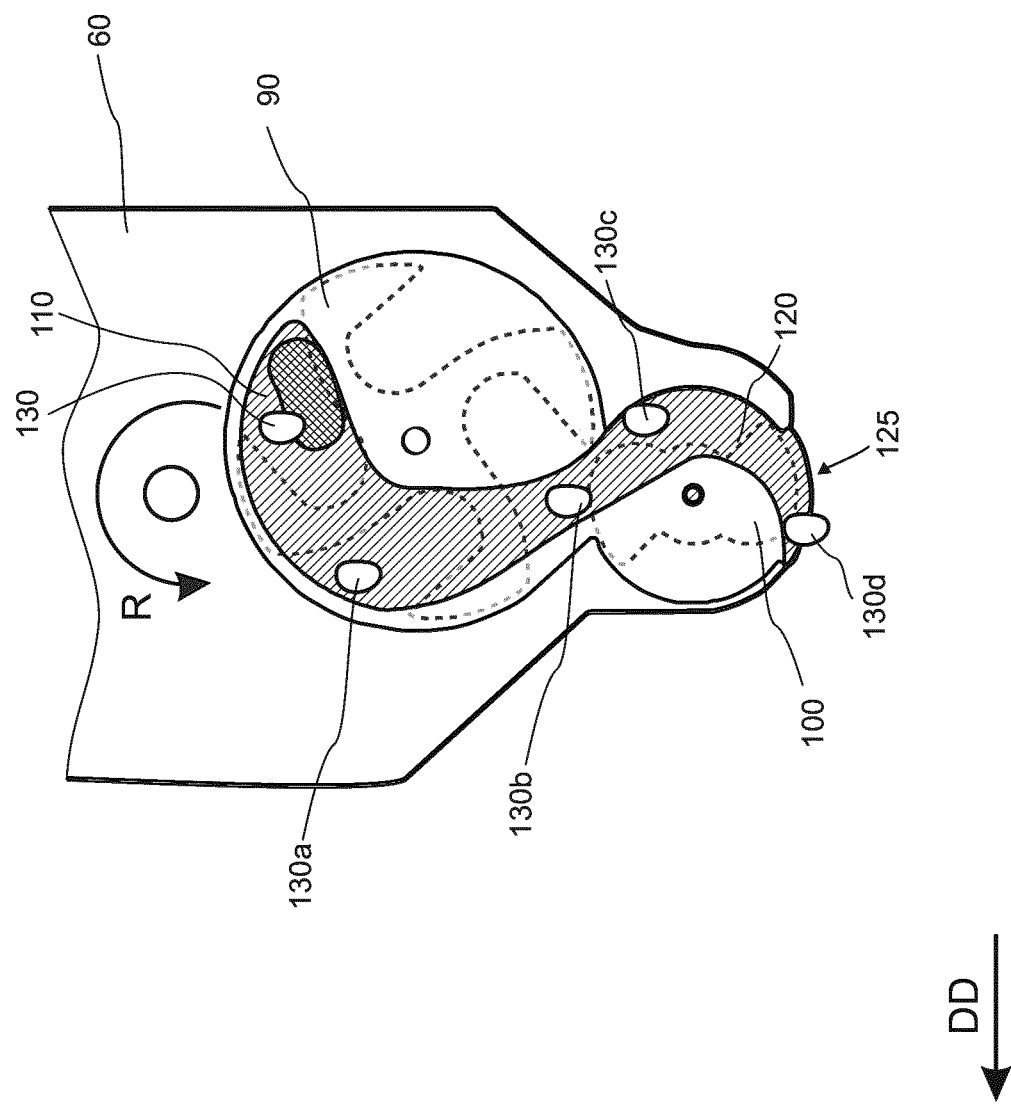

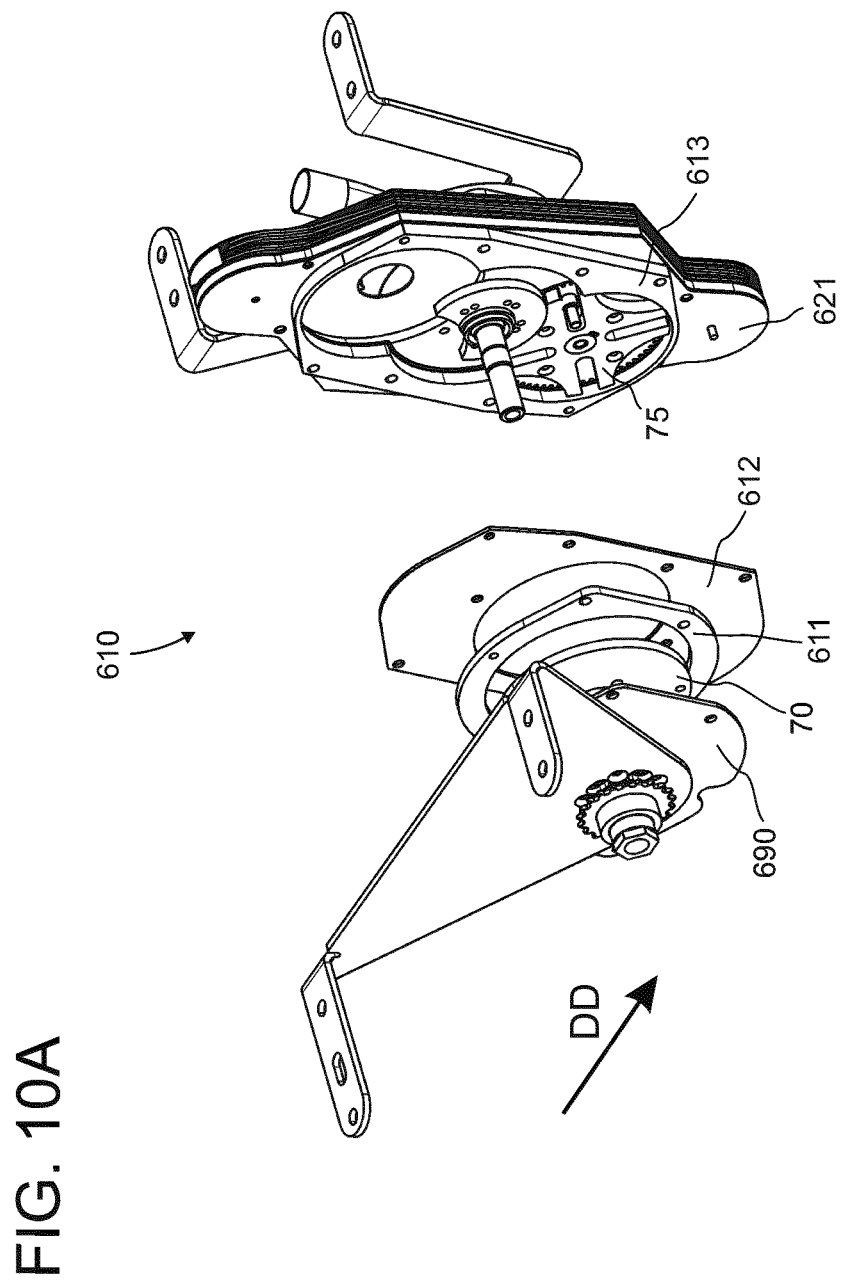

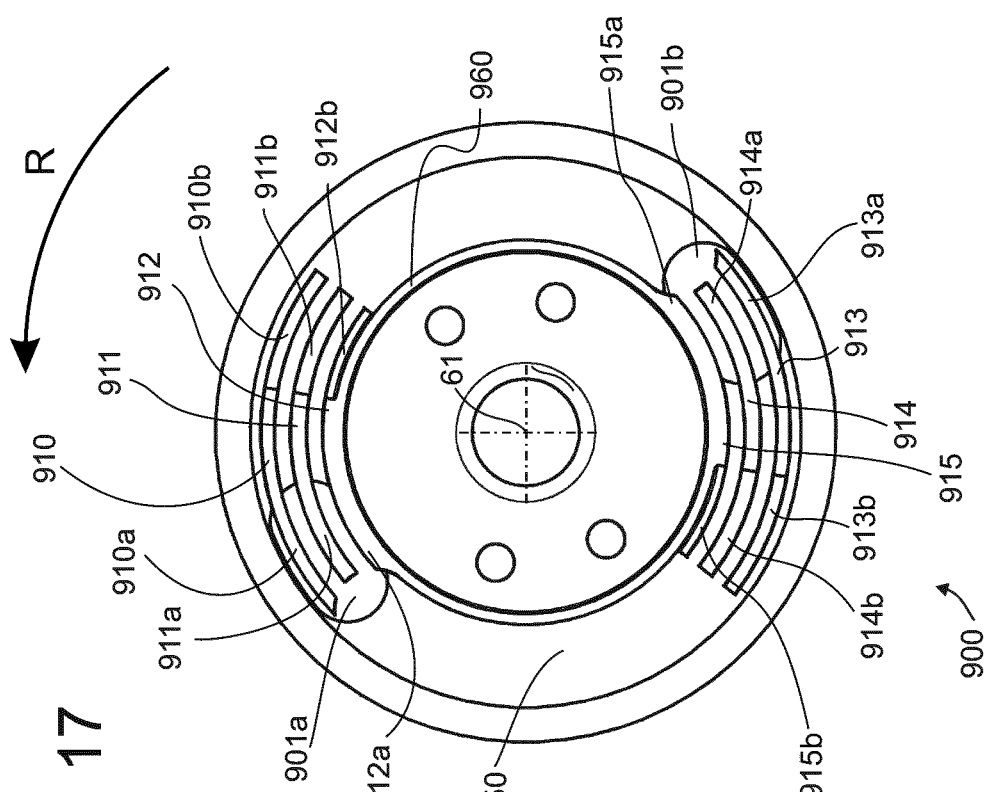
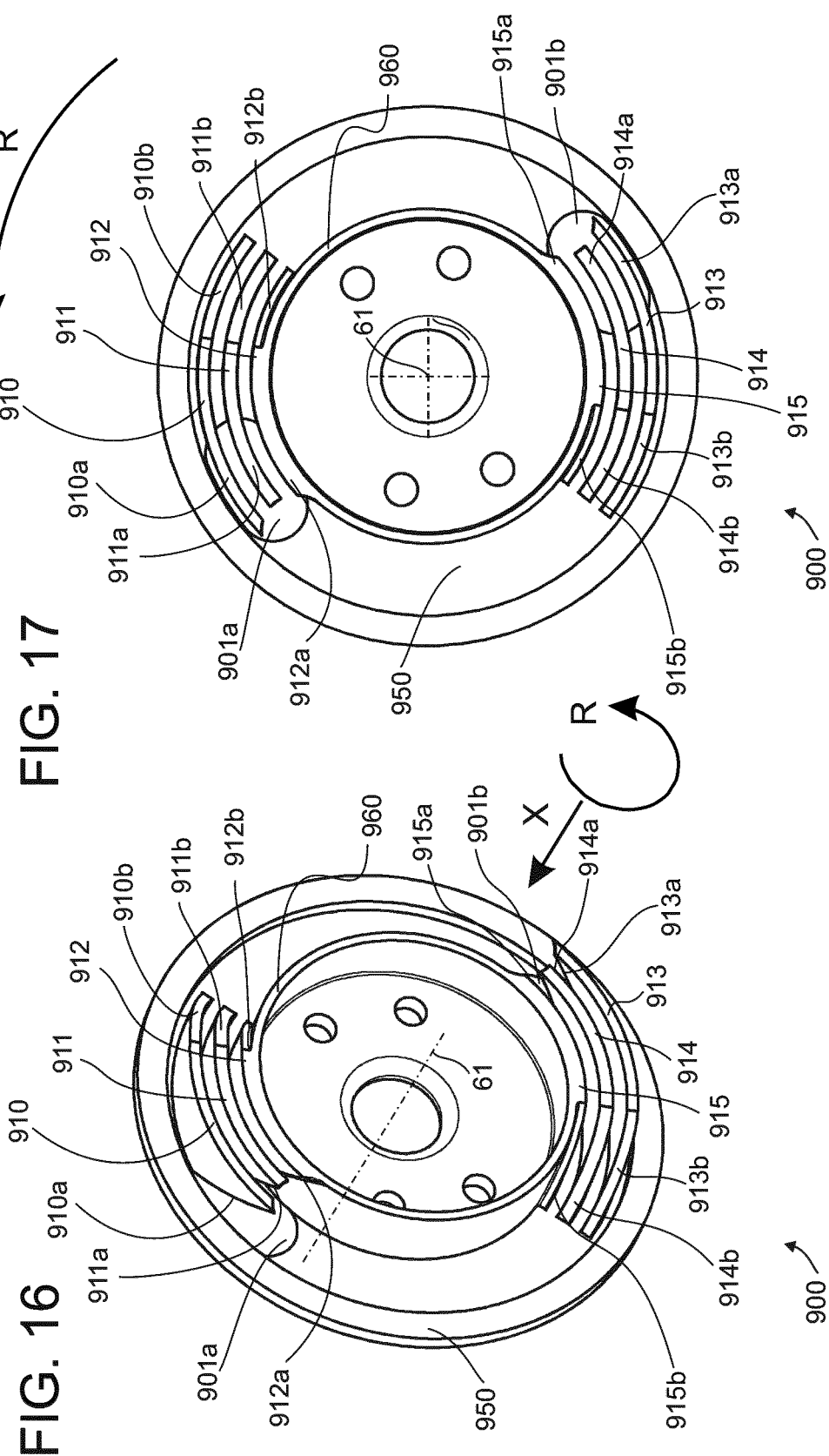

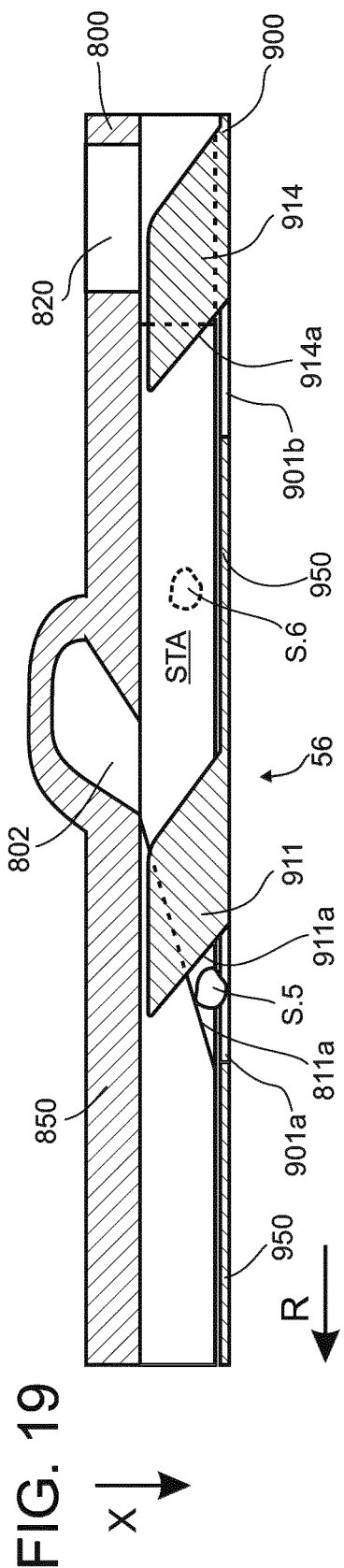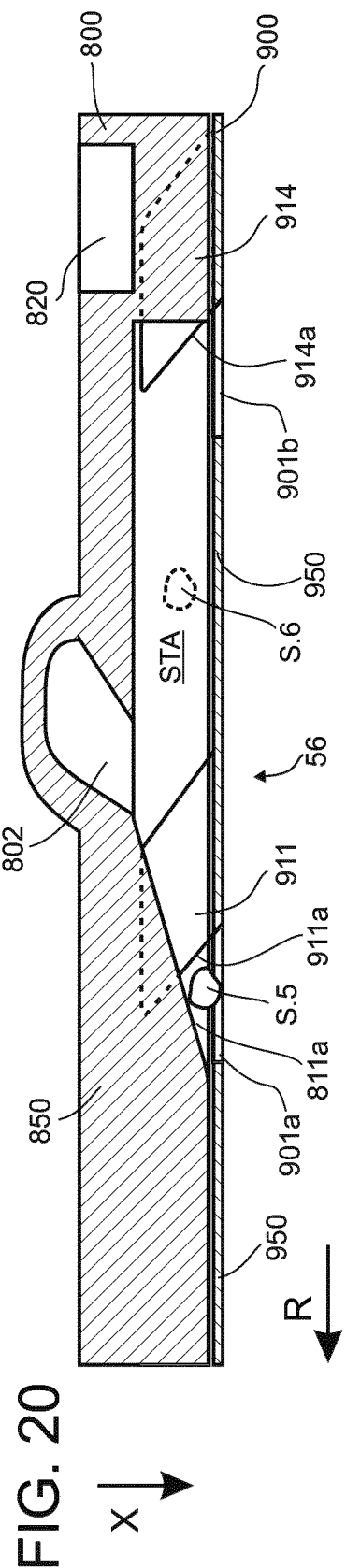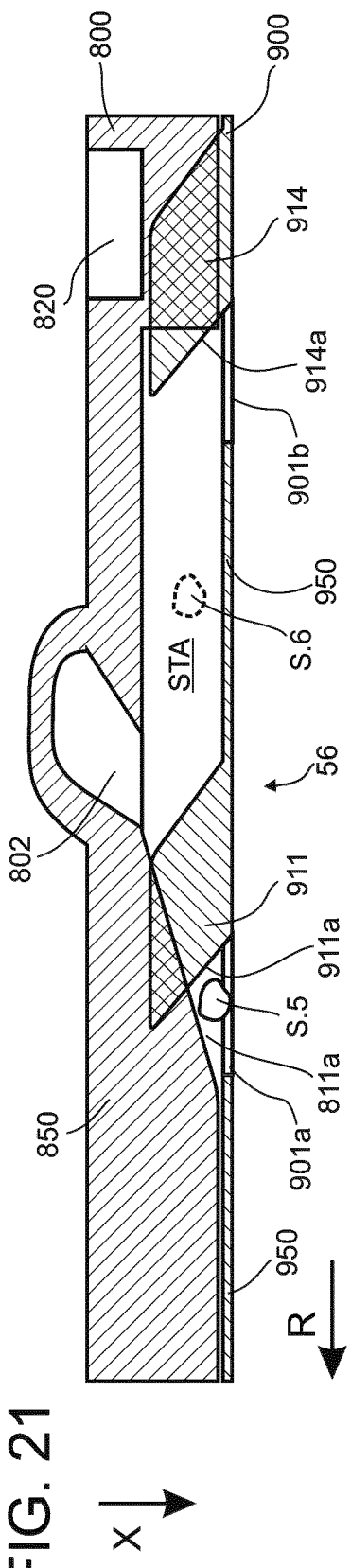

SEED PLANTER TRANSFER UNIT

BACKGROUND

Field

The invention is related to planters and particularly, although not exclusively, to those for use in automated agriculture systems comprising one or more driverless vehicles configured to perform the planting operation without direct intervention or control by an operator.

Ensuring food supply is the main challenge for the future of human life on planet earth. To reach for a sustainable and sufficient food supply current agricultural production systems and methods will need to go through radical changes. Arable land is limited: its effective, sustainable use is mandatory, especially as competition for use (Food, Feed, Fuel, Fiber) grows. High production costs provoke high food prices, especially critical for poor countries, and inaccurate use of seeds and agrochemicals results in high production costs and wasted resources.

Precision Farming (the accurate use of resources down to the plant as smallest individual unit) is a necessary measure to approach the mentioned challenges, but this is hard to achieve with large scale equipment (from a technical perspective as well as an economical perspective) and soil damage cannot substantially be reduced on heavy equipment due to the laws of growth (3D mass versus 2D contact area).

Description of Related Art

The answer to some of these issues is small automated driverless vehicles (robots), also known as autonomous agricultural machines (AAM's) able to operate around the clock without human surveillance. An example of such an automated agriculture system is described in the commonly-assigned International patent application WO2016/087535A1.

The conventional method of planting seeds (named drill seeding) involves using a disc, a plow or diverging blades to open a furrow, placing the seeds therein and using a closure device to cover the seeds with soil. This method is widely used in agricultural machine seeding.

Overview

In accordance with the present invention there is provided a seed transfer unit for an agricultural planter, comprising:

a first transfer body comprising a first plate with a first cylindrical sidewall extending perpendicularly from the plate;

a second transfer body comprising a second plate with a second cylindrical sidewall extending perpendicularly from the plate;

wherein the first and second plates are mounted to permit relative rotation therebetween about a device axis coincident with the major axes through the first and second cylindrical side walls, with the first and second plates parallel, and with the second cylindrical side wall disposed within, and concentric with, the first cylindrical side wall, such that the first and second plates and first and second cylindrical side walls define an annular space therebetween;

wherein the first plate has an inlet aperture through which a seed may pass to the annular space, and the second plate has at least one outlet aperture through which a seed is ejected from the annular space; and wherein each of the first and second plates has at least one arcuate ridge portion concentric with the respective cylindrical side wall and extending into the annular space, which ridge portions cooperate to carry a seed through the annular space from the inlet aperture to the, or one of the, outlet apertures as the first and second plates rotate relative to one another.

Whilst workable with single ridges, preferably each of the first and second plates has a plurality of ridge portions arranged in interlocking pectinated (comb-like) manner in the annular space.

Suitably, the, or each ridge portion of the first plate is terminated in the vicinity of the inlet aperture, and preferably the, or each ridge portion of the first plate has a chamfered or angled portion in which the height of the ridge increases with distance from the inlet aperture.

The, or each of the ridges of the second plate may have one or more discontinuous portions defining a gap to receive a seed. As will be described in further detail with reference to exemplary embodiments below, the or each ridge portion of the second plate may have a chamfered portion in which the height of the ridge increases with distance from the gap, and the or each ridge portion of the second plate may have a downwardly-chamfered portion at least partially overlapping the or each outlet aperture, in which the depth of the ridge increases toward the second plate with increasing distance from the gap. As will become apparent, this generally parallelogram shaping for the ridges of the second plate both assists in the collection of seeds deposited in the gap and causes their forced ejection through the outlet.

The seed transfer unit of the present invention may have two or more outlet apertures in the second plate, regularly radially spaced with respect to the device axis.

At least one of the first and second plates may have an aeration vent in the vicinity of the inlet aperture, which aeration vent is preferably blocked to the passage of seeds by one or more ridge portions of the first or second transfer body.

Also in accordance with the present invention there is provided a seed placement device comprising a chassis and transport means operable to carry the chassis across ground, including a seed transfer unit as recited above. The seed placement device suitably further comprises a rotating seed placement unit coupled to receive seeds ejected from the outlet aperture of the seed transfer unit, which placement unit is operable to place or plant the same.

It will be understood that references herein to seed placement include seed planting, with the differentiation being whether or not the planter vehicle that deposits the seeds at a particular location also closes the soil over the deposited seed. The seed placement unit of the present invention may be provided with additional mechanisms for soil closure over a deposited seed, which additional mechanisms are outside of the scope of the present disclosure. References herein to seeding, planting, or seed placement will be understood to be interchangeable.

BRIEF DESCRIPTION OF THE DRAWINGS

Further features and advantages of the present invention will become apparent from reading the following description of embodiments of the invention, given by way of example only, with reference to the accompanying drawings in which:

FIGS. 8A to 8C represent the passage of a seed through the seed placement unit of FIG. 4 as the unit rotates;

FIGS. 10A to 10D are a series of exploded views and FIGS. 10E to 10I are a series of sectional views illustrating the assembly of the seed placement unit;

FIG. 16 is a perspective view of the rotating transfer body shown in FIG. 13;

FIG. 17 is a view of the rotating transfer body in a direction indicated with arrow X shown in FIG. 16;

FIG. 19 is a view of circular section C-C shown in FIG. 18;

FIG. 20 is a view of circular section D-D shown in FIG. 18; and

FIG. 21 is a combined view of circular sections C-C and D-D shown in FIG. 18.

DETAILED DESCRIPTION

While the disclosure will be described in connection with these drawings, there is no intent to limit it to the embodiment or embodiments disclosed herein. For instance, in the description that follows, the focus is on a self-propelled agricultural seeding machine embodied as an autonomous agricultural robot, though it should be appreciated that other embodiments of seeding machines are contemplated to be within the scope of the disclosure. Further, although the description identifies or describes specifics of one or more embodiments, such specifics are not necessarily part of every embodiment, nor are all various stated advantages necessarily associated with a single embodiment or all embodiments. On the contrary, the intent is to cover all alternatives, modifications and equivalents included within the scope of the disclosure as defined by the appended claims. Further, it should be appreciated in the context of the present disclosure that the claims are not necessarily limited to the particular embodiments set out in the description.

Figure 1:
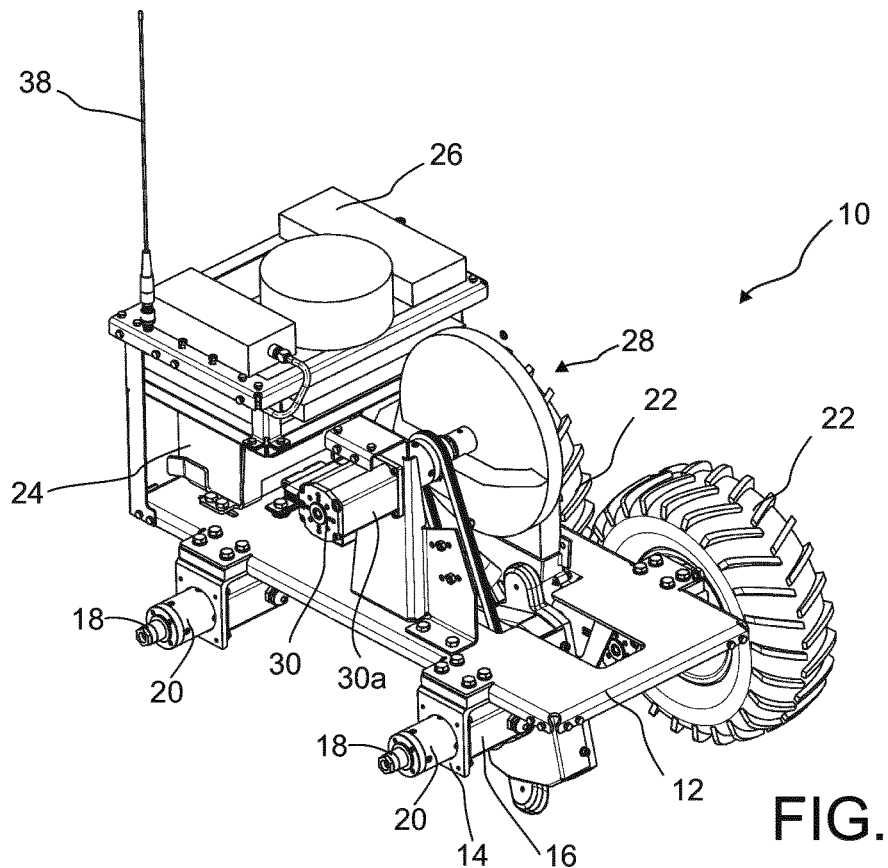
FIG. 1 is a perspective view of a self-propelled seeding vehicle.

FIG. 1 shows a vehicle in the form of an autonomous agricultural machine (AAM) 10 intended to be operated in clusters to perform an agricultural operation (in this case seeding/planting) on a field without direct operator control. The AAM's are self-propelled and have guidance and self-steering to enable them to traverse a field according to a predetermined path (which may be dynamically reassigned during operation by centralized or remote control) such that a cluster of AAM's cooperate to seed a field with individual seeds planted or deposited at predetermined locations.

The AAM 10 comprises a base-plate or chassis 12 to which are attached four support brackets 14, each mounting a respective drive motor 16, with each motor having an outwardly extending shaft to which are attached respective reduction gear units 20 providing output shafts 18 driving wheels 22 (two omitted for reasons of clarity). Motive power for the drive motors 16 is provided by a battery pack 24, with control of the drive to the individual drive motors 16 (including differential steering through control of the motor speed to each wheel) being handled by a drive/control and guidance system—indicated generally at 26 and described in further detail below with reference to FIG. 2.

Figure 2:
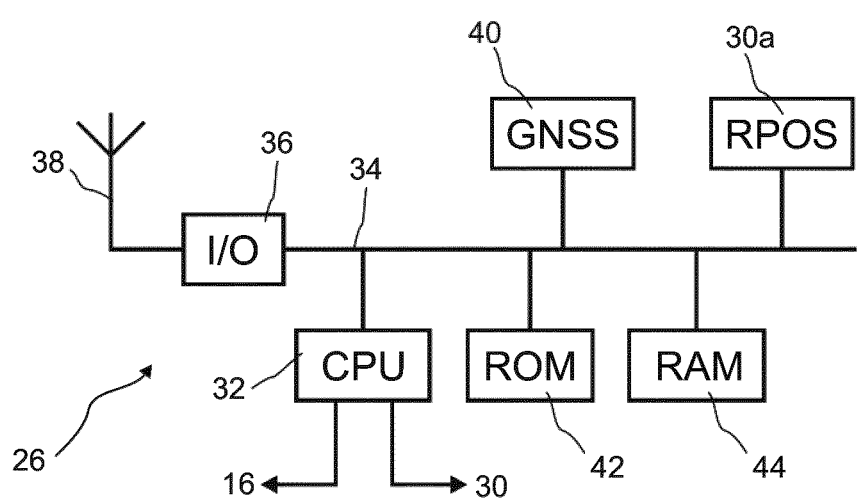
FIG. 2 schematically represents components of a control system for the vehicle of FIG. 1.

The AAM 10 further comprises a rotating seed sorting and placement unit, indicated generally at 28 and described in further detail below with reference to FIGS. 3 to 10. The seed sorting and placement unit 28 is mounted on the chassis 12 and operates through an aperture therein to deposit or plant seeds on or in the soil of a field traversed by the AAM under direction of the drive/control and guidance system 26 controlling a seeder motor 30 of the seed sorting and placement unit 28. Suitably the seeder motor 30 includes a rotary position sensor (30a; FIG. 2) such that the drive/control and guidance system 26 can stop the rotation of a seed placement unit 52 of the seed sorting and placement unit 28 with the seed placement unit 52 in one or more predetermined orientations, as discussed further below, as well as varying the speed of rotation.

The components of the drive/control and guidance system 26 are illustrated schematically in FIG. 2 and are based around a central processing unit (CPU) 32. The CPU 32 may be embodied as a custom-made or commercially available processor, an auxiliary processor among several processors (although simplicity in component numbers is desirable for an AAM), a semiconductor based microprocessor (in the form of a microchip), a macroprocessor, one or more application specific integrated circuits (ASICs), a plurality of suitably configured digital logic gates, and/or other well-known electrical configurations comprising discrete elements both individually and in various combinations to coordinate the overall operation of the drive/control and guidance system 26.

The CPU 32 is coupled via an address and data bus 34 to an I/O interface 36 to an aerial 38 which may provide one or more interfaces to a remote network or control system for a cluster of the AAM's. Additionally (although an additional aerial or antenna array may be used), this provides input for positioning data, for example Global Positioning System (GPS) or Global Navigation Satellite System (GNSS) data which is resolved in an on-board positioning system 40 to identify the current location of the AAM. With the rotary position sensor 30a detecting the orientation of the rotating seed placement unit 52 relative to the AAM at the instant of seed placement, the location of individual seeds is also determined.

Additionally coupled to the CPU 32 via bus 34 are onboard storage devices represented by read-only (ROM) and random-access (RAM) devices 42, 44. The ROM 42 suitably carries the boot-up and general operational software for the AAM (for example in terms of routines to be followed when deviation from a pre-planned path is necessitated by an encountered obstruction), whilst the RAM 44 captures transitory data such as the location of obstacles encountered (location determined by guidance/positioning system 40) and the actual location of seeds planted/deposited—for example where this departs from a pre-planned positioning due to environmental conditions and/or issues with the operation of the AAM.

When certain embodiments of the drive/control and guidance system 26 are implemented at least in part as software (including firmware), it should be noted that alternatively or in addition to ROM 42, the software can be stored on a variety of non-transitory computer-readable medium for use by, or in connection with, a variety of computer-related systems or methods. In the context of this document, a computer-readable medium may comprise an electronic, magnetic, optical, or other physical device or apparatus that may contain or store a computer program (e.g., executable code or instructions) for use by or in connection with a computer-related system or method. The software may be embedded in a variety of computer-readable mediums for use by, or in connection with, an instruction execution system, apparatus, or device, such as a computer-based system, processor-containing system, or other system that can fetch the instructions from the instruction execution system, apparatus, or device and execute the instructions.

When certain embodiments of the drive/control and guidance system 26 are implemented at least in part as hardware, such functionality may be implemented with any or a combination of the following technologies, which are all well-known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

In addition to the above-mentioned capture of AAM positional data, the AAM may be provided with additional sensors to capture further operational machine information (e.g., tilt/yaw variations from horizontal, machine performance, battery usage etc.) which may be stored locally by the CPU 32 in memory 44 and made available by transmission via aerial 38 (if the device is configured also to transmit), or transferred via memory device, such as a memory stick, plugged into the AAM by the operator, or stored remotely and accessed, such as from a data structure (e.g., database) upon operator request or automatically upon detection of an event (e.g. conditions indicating failure of an individual AAM of a cluster).

Output from the CPU 32 provides a controlled drive signal to the four individual wheel drive motors 16, or such other drivetrain mechanism as the AAM may have (e.g. independently controllable tracks instead of wheels) as well as to the seeder motor 30 of the seed placement unit 28, as will be described in further detail below. It is important to note that the operation of the seed sorting and placement unit 28 is not mechanically linked to the drive motors 16 of the AAM, and accordingly the operation to place/plant a seed occurs purely on the basis of the instantaneous AAM (vehicle) location and the current position of the seed placement unit 28 as determined by rotary position sensor 30*a* of seeder motor 30 without reference to the degree of turn of the wheels (which may otherwise give wrong results in slippery conditions).

Figure 3:
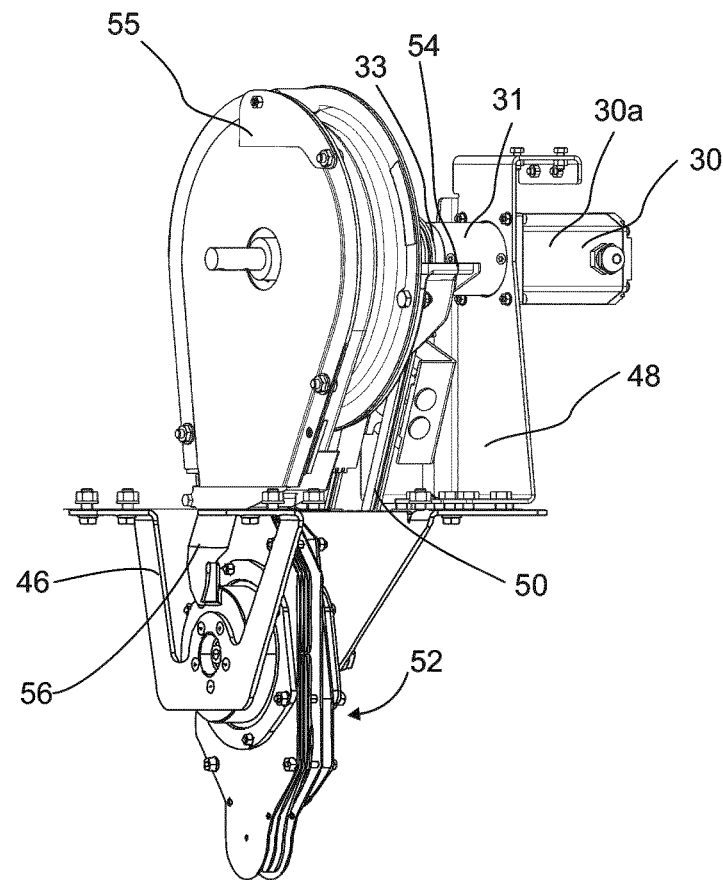
FIG. 3 is a perspective view of a seed sorting and planting assembly of the vehicle of FIG. 1.

FIG. 3 shows the main components of the seed sorting and placement unit 28, which is mounted to the chassis 12 of the AAM 10 by a pair of mounting brackets 46. Above the chassis, a mounting bracket 48 supports the drive seeder motor 30 which controllably rotates a sorting/singling unit 55 through a reduction gear 31 and the seed placement unit 52 (described below) via pair of pulleys 33 and belt 50 arrangement. This driveline may alternatively include the above-mentioned rotary position sensor 30*a* at another position.

A seed tank or reservoir 54 receives seeds to be planted or placed. As will be understood in the context of an AAM, replenishing the reservoir may be an autonomous activity triggered when the reservoir is low/empty, with the AAM leaving its current planned planting path to e.g. go to a host vehicle at the side of the field from which the reservoir may be replenished, before returning to the planned task.

Adjacent the reservoir 54, and coupled to receive seeds therefrom, is the sorting/singling unit 55 which takes seeds from the reservoir 54 and, in known fashion, separates them and outputs them as a sequence of individual seeds in a downward channel to transfer unit 56, with individual seeds feeding into one of a pair of seed channels (described below) in the seed placement unit 52, when the seed placement unit 52 is at a particular predetermined point in its rotation.

Figure 4:
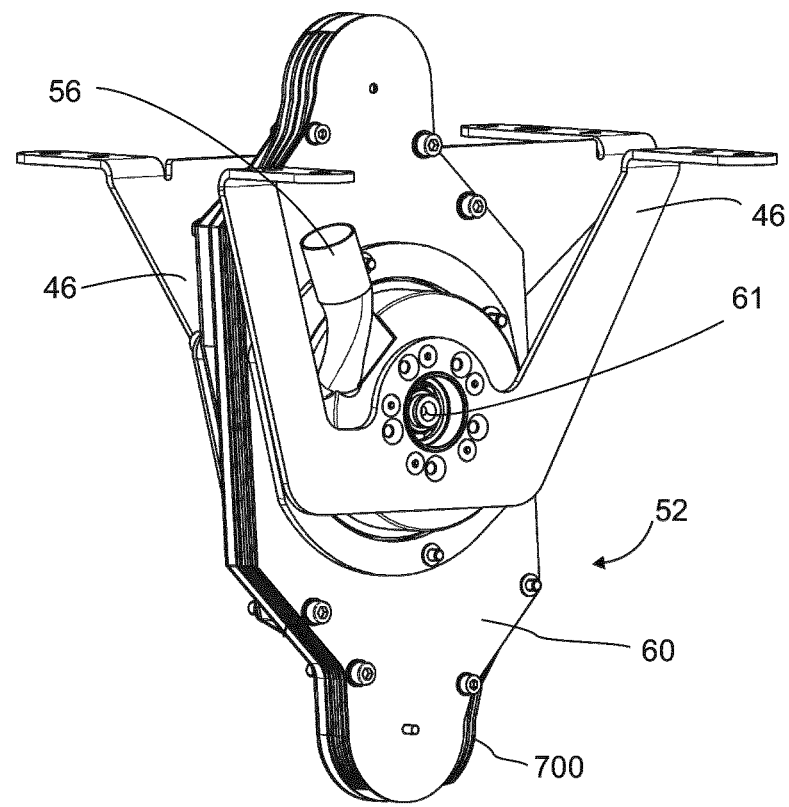
FIG. 4 is a perspective view of a seed placement unit of the assembly of FIG. 3.
Figure 5B:
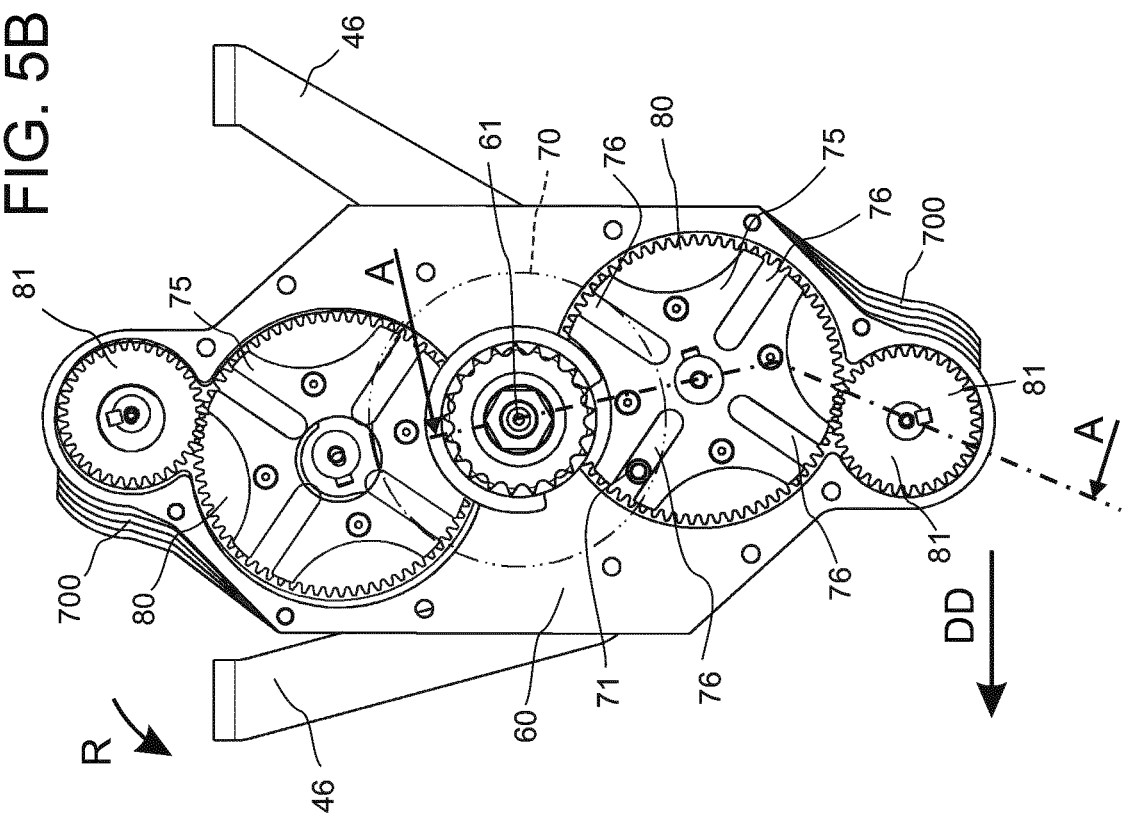
FIGS. 5A to 5C are a series of sectional schematics through the seed placement unit of FIG. 4.
Figure 5A:
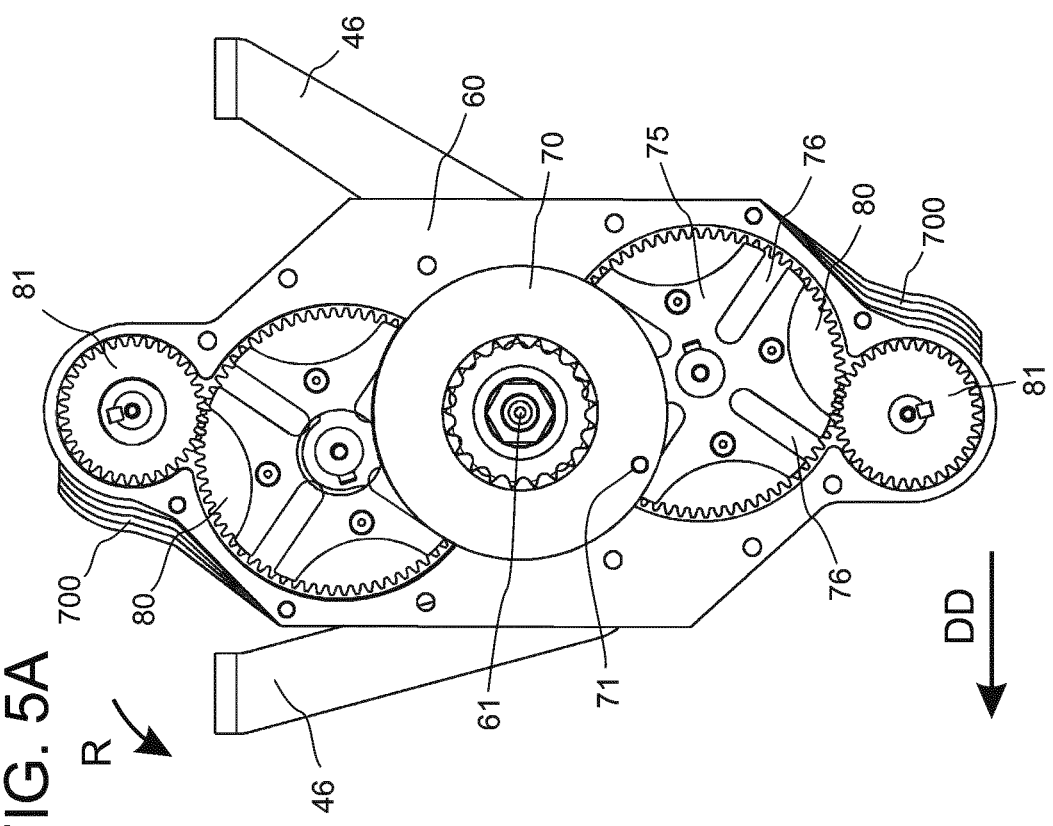
Figure 6:
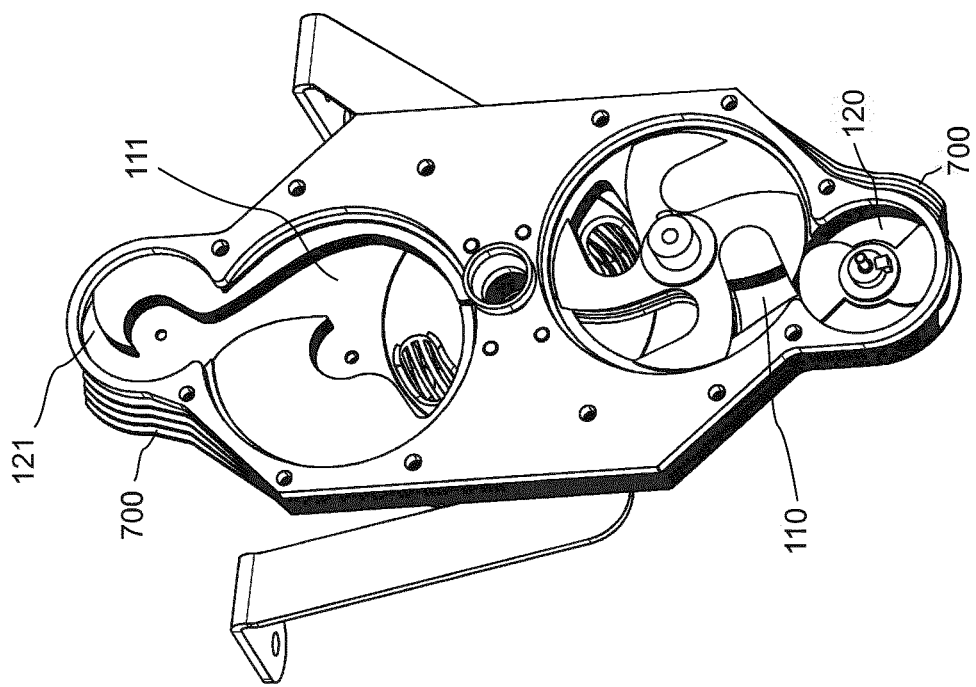
FIG. 6 is a perspective view of the seed placement unit of FIG. 4 with components omitted.
Figure 5C:
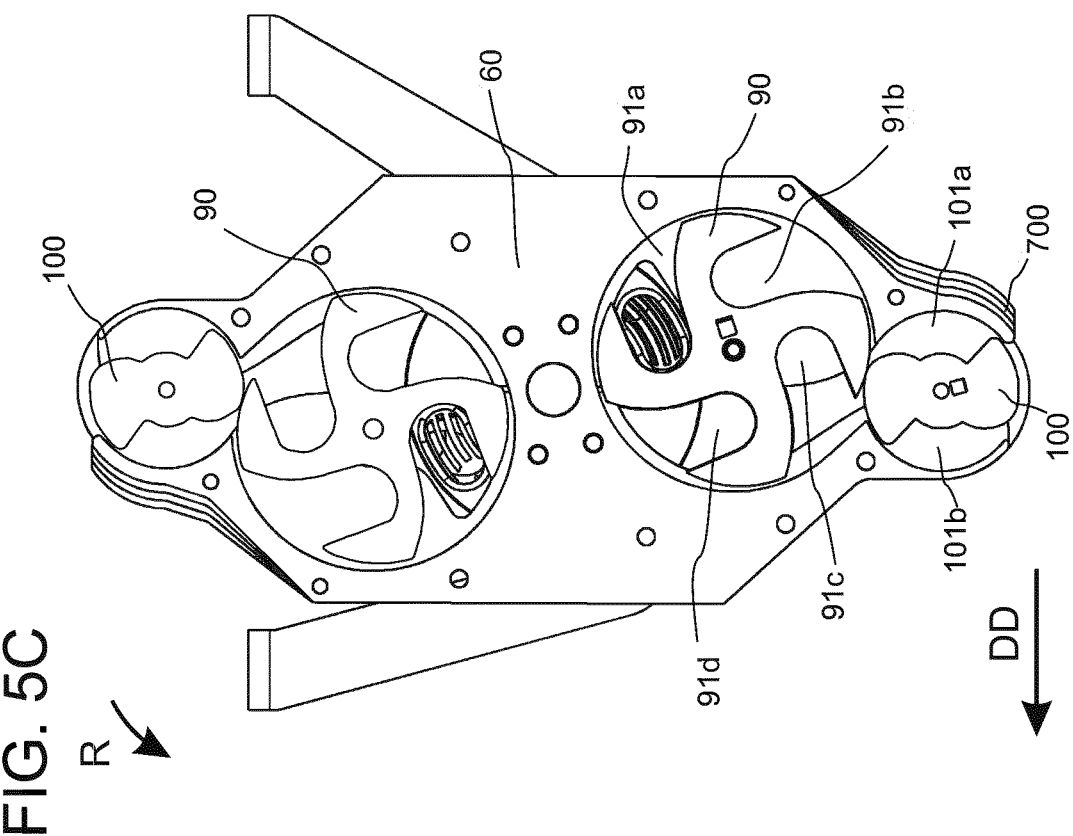

The rotating seed placement unit 52 is shown in greater detail in the perspective views of FIGS. 4 and 6 and the schematic sectional views of FIG. 5A to 5C. Whilst the present invention encompasses a single-ended mechanism, a double-ended version (as shown) is preferred, with two such mechanisms mounted end to end and rotating about a common axis. The seed placement unit 52 is formed as a layered assembly of components, with the sequence of FIGS. 5A to 5C representing a double-ended version with successive layers of components omitted. In FIG. 6, some further components are omitted, from the upper mechanism only, for clarity.

In a first embodiment, considering just the components of a single-ended mechanism, the seed placement unit 52 comprises a body or housing 60 rotatable by motor 30 about a central and generally horizontal axis 61. The housing consists of a structure, provided by stacked sheet metal parts, which structure is described below in detail. The rotating seed placement unit 52 uses the concept of a Maltese gear or Geneva drive for main drive, the main components will now be explained.

The main body 60 is rotated about axis 61 by motor 30 (FIG. 3). The Maltese gear contains a drive wheel 70 which is shown in position in FIG. 5A and omitted, but represented by dotted lines, in FIG. 5B. The drive wheel 70 has a pin 71 attached and is fixed relative to the mounting brackets 46 (so that it does not rotate with body 60). Within the body 60, and rotatably mounted relative to body 60, there is a further component of the Maltese gear, namely the Maltese cross part 75. The Maltese cross part 75 is a plate provided with four slots 76 extending radially inwards towards the centre of the plate for engagement with the pin 71.

During rotation of the body 60, the pin 71 engages slots 76 so that the Maltese cross part 75 is rotated relative to body 60. As the Maltese cross part 75 is provided with four slots 76, a full 360° turn of body 60 results in a 90° turn of Maltese cross part 75 relative to body 60.

With reference to FIGS. 5B and 5C, the Maltese cross part 75 is fixedly connected to a first gear wheel 80 for joint rotation therewith about an axis through the centre of the cross part 75. A second rotatably mounted gear wheel 81, located generally outwards of the first gear wheel 80 relative to the centre axis 61, engages with first gear wheel 80. As the number of teeth provided for first gear wheel 80 is twice that of the second gear wheel 81, the second gear wheel 81 provides a full turn (relative to body 60) if the first gear wheel 80 does a half turn.

To summarize the rotational movement of the main components:

During a full 360° turn of the body 60, the Maltese cross part 76 is pivoted through 90° by the engagement of the pin 71 with one of the slots 76.

The first gear wheel 80 is moving with Maltese cross part 76 so that, with a 360° turn of the body 60, first gear wheel 80 is also incrementally moved through 90° anti-clockwise relative to body 60.

Due to the gearing ratio between the first and second gear wheels 80, 81, with a 360° turn of the body 60, second gear wheel 81 turns 180° clockwise relative to body 60.

The seed placement will now be described, whereby the driving direction DD of the AAM is to the left (shown with arrow DD in the figures) and the rotation of the seed placement unit 52 is anti-clockwise, as shown with arrow R.

The first gear wheel 80 is fixed to a rotatably mounted guidance wheel 90 which, as shown in FIG. 5C, provides four seed chambers 91a-91d. During operation, three of these seed chambers have a seed carried inside while the fourth one is empty. Note that in the orientation of the Figures, guidance wheel 90 is pivoting anti-clockwise in FIG. 5A to 5C and FIG. 6.

The second gear wheel 81 is fixed to a rotatably mounted closing wheel 100 which provides two radially opposed seed chambers 101a, 101b in its periphery. During operation, one seed chamber is storing a seed while the other is discharging the seed to the ground. Closing wheel 100 is pivoting clockwise in FIG. 5A to 5C and FIG. 6.

As shown in in FIG. 6, guidance wheel 90 consists of several sheet metal parts stacked together to form a pectinated cross section which is in cooperation with a seed channel 110 formed in body 60 by the stacked sheet metal parts forming the body as described below.

Figure 10B:
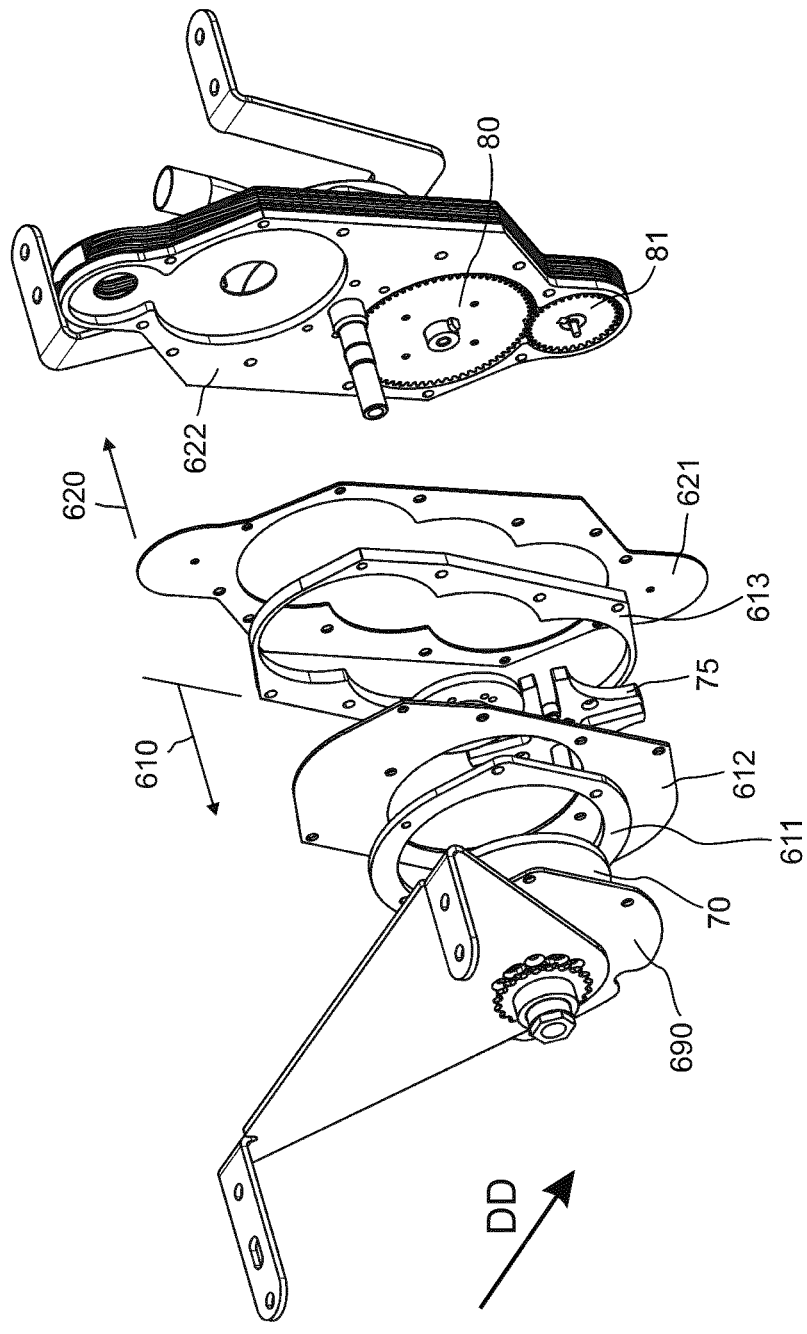
Figure 10C:
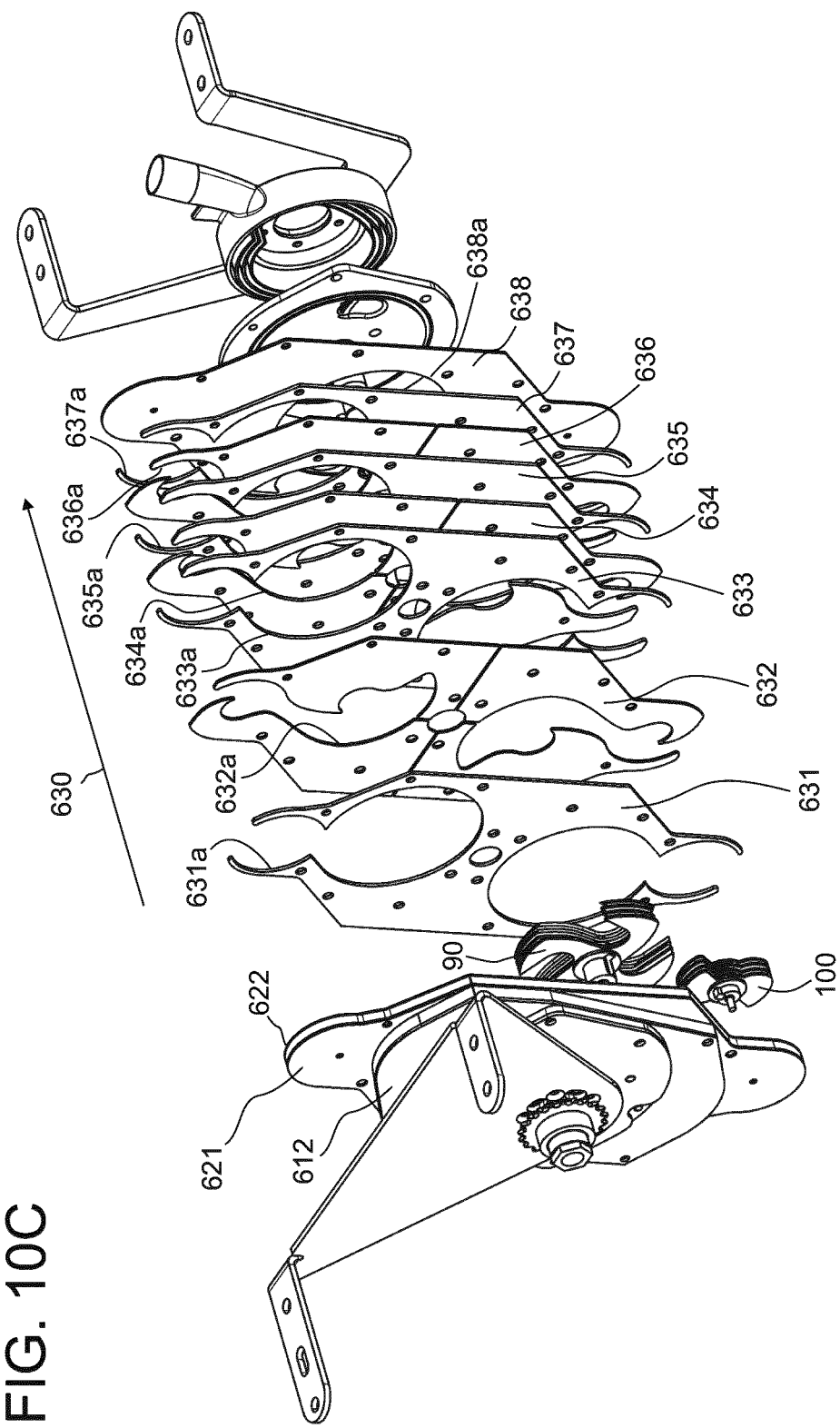
Figure 10D:
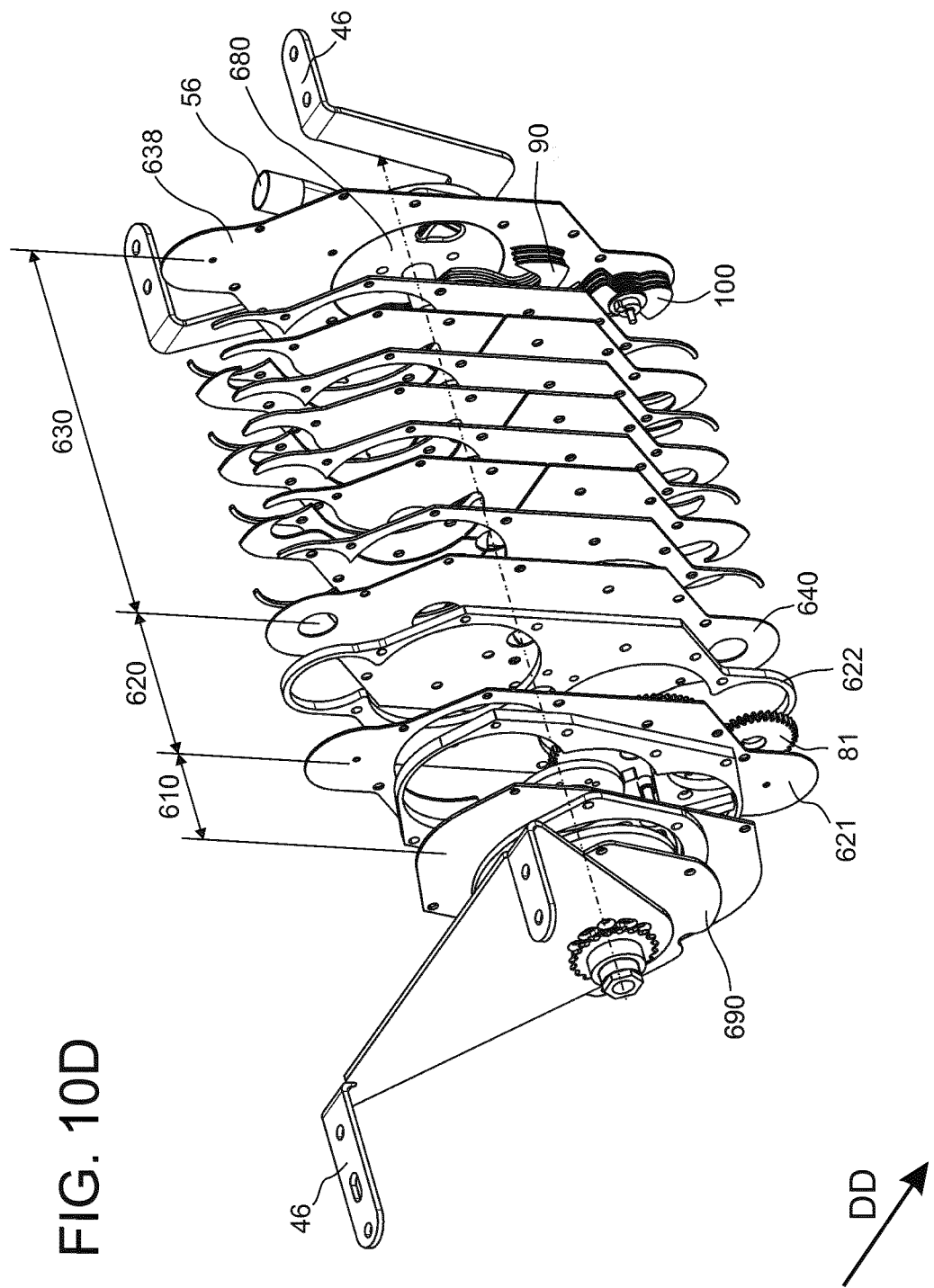
Figure 10E:
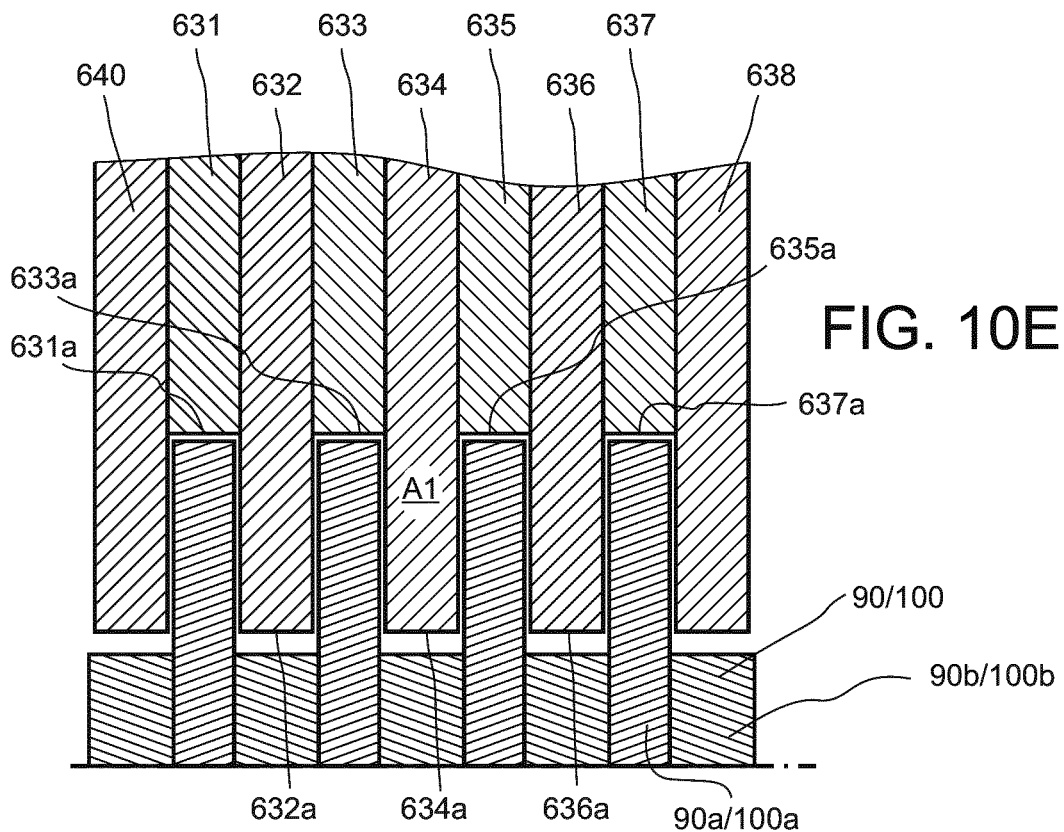

Closing wheel 100 consists of several sheet metal parts stacked together to form a pectinated cross section which is in cooperation with a placement chamber 120 formed in body 60 by the stacked sheet metal parts forming the body as shown in FIG. 10E and as described below.

As mentioned above, the arrangement of seeding placement unit 52 is optimized as a back to back (or end to end) arrangement of two planters as described above. Reference to FIGS. 5A to 5C and FIG. 6 will show how this is achieved with the addition of a further Maltese cross part 76, first gear wheel 80, second gear wheel 81, guidance wheel 90, closing wheel 100 and the respective provisions in body 60 such that both units utilize the single pin 71 and operate 180 degrees out of sequence as the unit rotates to transport a seed also along second seed channel 111 and placement chamber 121.

Figure 7A:
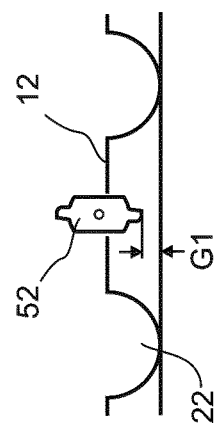
FIGS. 7A and 7B respectively represent the orientation of the seed placement unit of FIG. 4 in operational and non-operational modes.
Figure 7B:
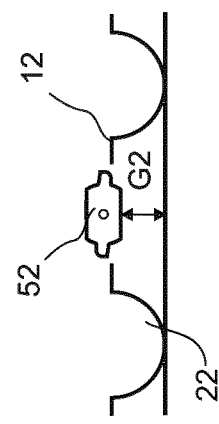

A further benefit of the double-ended arrangement (as illustrated by FIGS. 5A to 5C), coupled with the control system 26 operating the planter mechanism independently of the motion (speed and/or position) of the AAM across the ground is that when the AAM is in a non-operational state, necessitating crossing the field to restock with seeds to the reservoir 54, the seed placement unit 52 may be turned to a generally horizontal orientation (with the two closing wheels 100 generally horizontally aligned) such that the reduced width of unit 52 compared to the ends from which the seeds emerge) gives an improved ground clearance G2 compared to that G1 (between body 60 and ground) when working and a distal end of the body 60 (containing one of the closing wheels 100) is closest to, or engaging, ground, as shown in FIGS. 7A and 7B. Preferably G1 will be smaller than zero so that body 60 can engage the ground by opening a recess to receive a seed. As the direction of driving (indicated with arrow DD) and the direction of rotation R of the seed placement unit 52 act in the same direction (on the level of ground), and as the speed over ground of the vehicle and the seed placement unit 52 is similar on ground level, the vehicle is not accelerated or braked by rotation of the seed placement unit 52. This enables an energy saving operation.

Figure 8A:
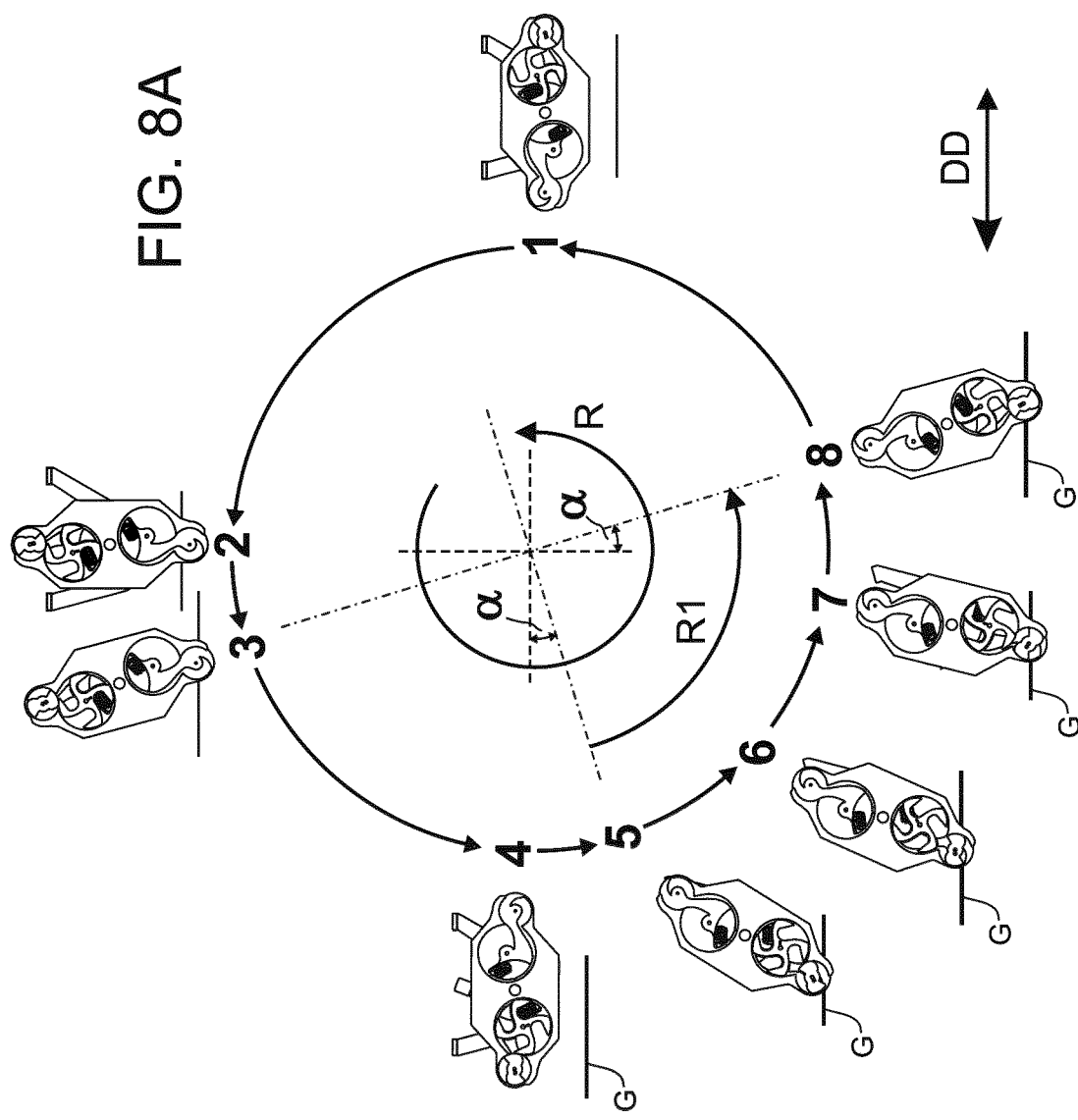

Turning now to the operating sequence illustrated by FIG. 8A, the body 60 is shown in a sequence of positions 1 to 8 as it turns through 360° with the relative position of ground shown by horizontal line G. As best seen in FIG. 8A, the guidance wheel 90 and closing wheel 100 are only pivoted when the body 60 turns within a range R1 of 90° between positions 5 and 8 (from an angle of around 15° below horizontal to around 15° past vertical position indicated at a) when the seed is placed in ground at position 8. During the rest of the rotation (270°), guidance wheel 90 and closing wheel 100 are kept in their respective positions relative to body 60 by friction or spring bias.

FIG. 8B shows a detail of FIG. 8A reduced to the travel between positions 4 and 8 (including range R1 between positions 5 and 8) and showing the relative positions of four sequentially received seeds S.1-S.4 forwarded in one of the planters of the seeding unit. In position 4, the first received seed S.1 is held in a recess of the closing wheel 100 in placement chamber, whilst three further seeds S.2-S.4 are held in respective recesses of the guidance wheel 90 (with seed S.4 having been received between positions 3 and 4). At position 5, the generally wedge-shaped part 700 of the body 60 in the vicinity of the outlet 125 (described further below) has begun to engage the ground G, and the Geneva drive begins to index the guidance wheel through a quarter turn, and the closing wheel through a half turn. Through positions 6 and 7, the wedge-shaped part 700 creates an opening and the closing wheel rotates to enable the seed S.1 to pass through opening 125, whilst at the same time the closing wheel 100 is receiving the next seed S.2. Further rotation leads to precise positioning of the first seed S.1 by closing wheel 100 in the created opening at position 8.

FIG. 8C illustrates the way which a seed passes through the body 60 as it is rotated through four full turns. Note that guidance wheel 90 and closing wheel 100 are shown in a static position in dotted lines. The sequence is as follows:

1. During the first turn, a seed 130 enters from sorting/singling unit 55 into the seed channel 110 and is moved by the 90 degree rotation of guidance wheel 90 to a position indicated at 130a.
2. During the second turn, the seed 130 is moved in the seed channel 110 by a further 90 degree rotation of guidance wheel 90 to a position indicated at 130b.
3. During the third turn, the seed 130 is moved in the seed channel 110 by a further 90 degree rotation of guidance wheel 90 and transferred from the seed channel 110 to a placement chamber 120 containing the closing wheel 100, as indicated at position 130c.
4. During the fourth turn, the seed 130 is carried by closing wheel 100 through the placement chamber 120 to an opening 125 in the body 60, and is pushed into soil by the closing wheel 100 at position 130d.

Subsequent seeds are transported in like manner.

For each full turn of body 60, one seed is transferred from the sorting/singling unit 55 into each planter of the seed placement unit 52 and released into ground, such that the seed placement unit 52 can place two seeds per full turn.

It is envisaged that, depending on the number of slots in the Maltese cross part 76, the concomitant ratio between first gear wheel 80 and second gear wheel 81 and the number of seed chambers 91, 101 in guidance wheel 90 and closing wheel 100, different seeding rates (seeds per full turn) can be provided.

The stacked structure 600 of body or housing 60, and its provision of wedge-shaped ground-engaging portion 700, is now explained with reference to FIGS. 9 to 11.

Figure 9:
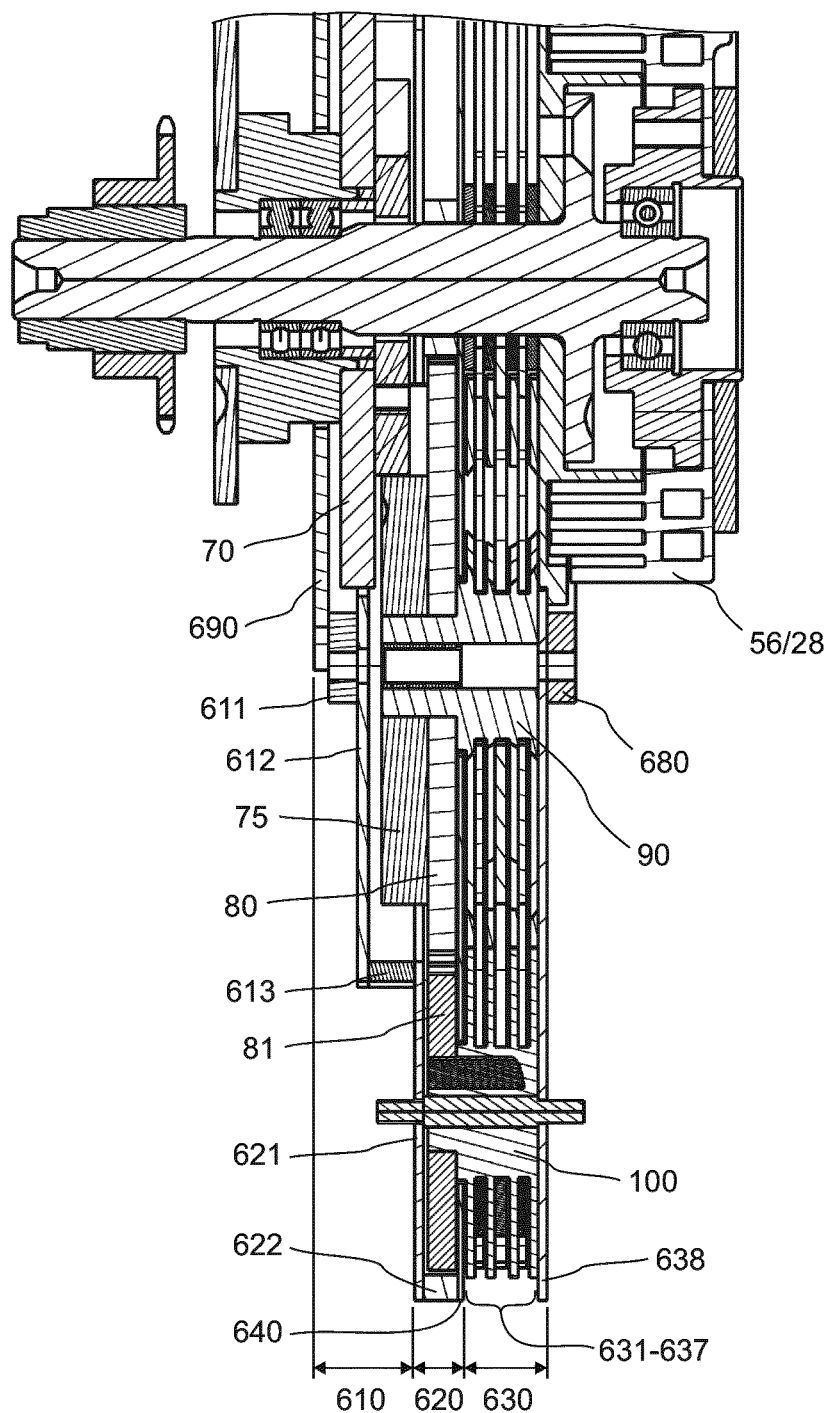
FIG. 9 is a sectional side elevation on line A-A of FIG. 5B through the assembled seed placement unit of FIG. 4.

FIG. 9 shows a sectional view taken on line A-A of FIG. 5B showing the body 60 and the structure 600. The structure 600 generally consists of three sections/levels 610, 620, 630 each comprised of a number of intermediate plates sandwiched between outer or bounding plates, in between final outer plates 680 and 690 at each end.

The first section 610 contains the components of the Maltese gear with drive wheel 70 and pin 71 (shown in FIGS. 5A, 5B) which engages with Maltese cross part 75. Distance plates 611, 612 and plate 613 are provided and enlarge the space for installation (as shown more clearly in the exploded views of FIGS. 10A and 10B).

The second section 620 contains first gear wheel 80 and second gear wheel 81 mounted in driving connection. In the orientation of FIG. 9, second section 620 is enclosed on the left side by plate 621 and concludes at the right hand side with plate 622. First gear wheel 80 and second gear wheel 81 are also enclosed at their radial edges by plate 622 (as shown in the exploded view of FIG. 10B).

The third section 630 contains guidance wheel 90 and closing wheel 100. In this section, the seeds are transported through the body 60. Section 630 is enclosed on the right side by plate 638. As can be seen in FIG. 10C, section 630 is assembled from two shapes of plate 631-637 which are alternately stacked. The first shape of plate 631, 633, 635, 637 has generally circular cutouts 631a, 633a, 635a, 637a forming an inner contour sized to accommodate the guidance wheel 90 and closing wheel 100 of each planter assembly. The second shape of plate 632, 634, 636 has a pair of more irregularly shaped cutouts 632a, 634a, 636a forming an inner contour defining the seed channel 110 and placement chamber 120.

Figure 10F:
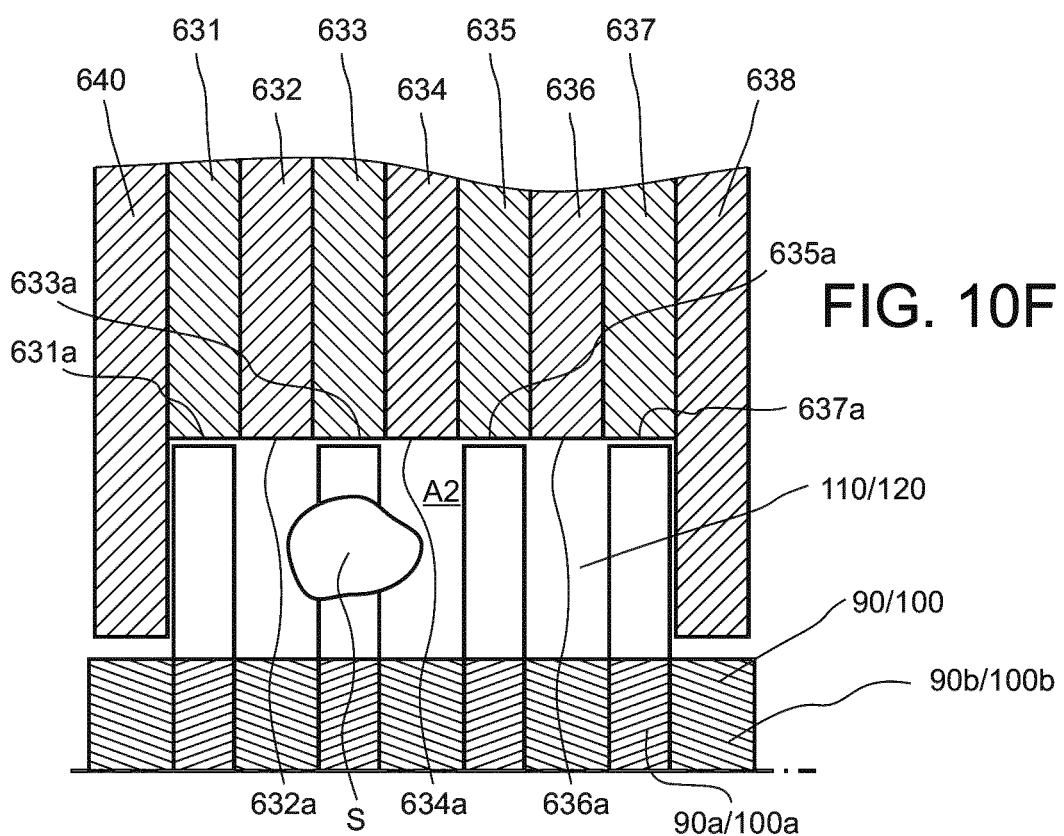
Figure 11A:
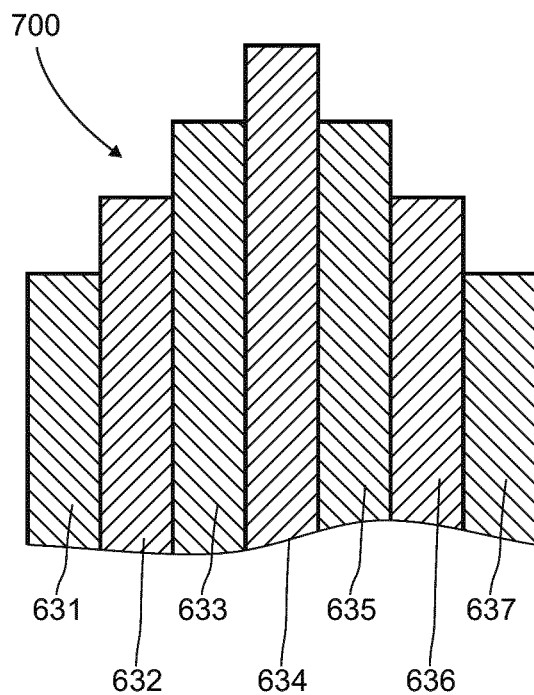
FIGS. 11A and 11B represent external shaping formed by the construction of the body of the seed placement unit.
Figure 11B:
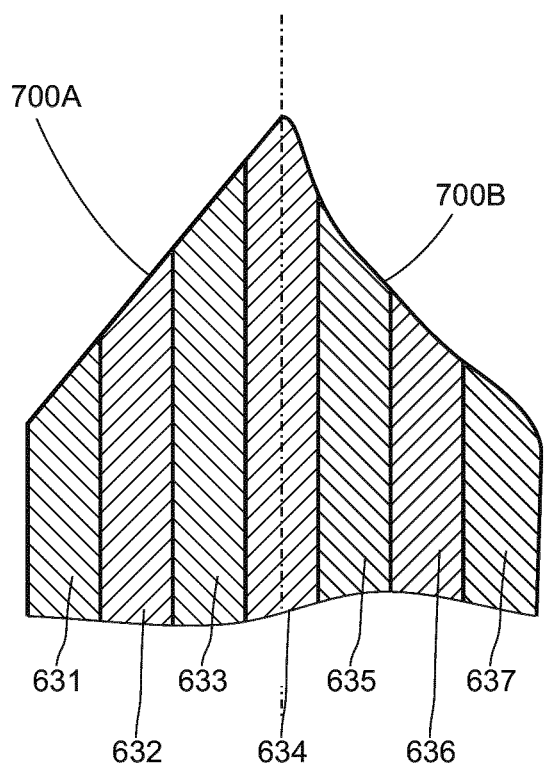

As the guidance wheel 90 and closing wheel 100 are assembled from multiple discs 90a/100a with spacers 90b/100b in between (not shown in FIG. 9), a basset or comb-shaped profile (seen in a section through the axis of rotation) is formed, as shown in FIGS. 10E and 10F. As schematically depicted in FIG. 10E, in a first area A1 the inner contours 631a-637a form the counterpart to this basset shape of wheels 90, 100 so that the alternate plates 632, 634, 636, enclosing plates 638, 640 and guidance wheel 90 or closing wheel 100 are in intermeshed relationship and able to move relative to each other. As depicted In FIG. 10F, in second area A2 the inner contours 631a-637a (enclosed by plates 638, 640) form seed channel 110 and placement chamber 120 in which guidance wheel 90 or closing wheel 100 can move the seed S taken by rotation of guidance wheel 90 or closing wheel 100. When pre-assembled, neither guidance wheel 90 nor closing wheel 100 can be plugged through a complete plate 632 having inner contours 632a, and so the plates 631-637 are separate to enable assembly.

In the embodiments described above, body 60, guidance wheel 90 and closing wheel 100 are made of stacked sheet metal parts. Alternatively, moulded parts, castings or 3D printed parts may be used instead or in combination. For example, guidance wheel 90 and closing wheel 100 may contain discs 90a/100a made of rubber stacked with plastic spacers 90b/100b. This may enable a more gentle seed transport.

Figure 10G:
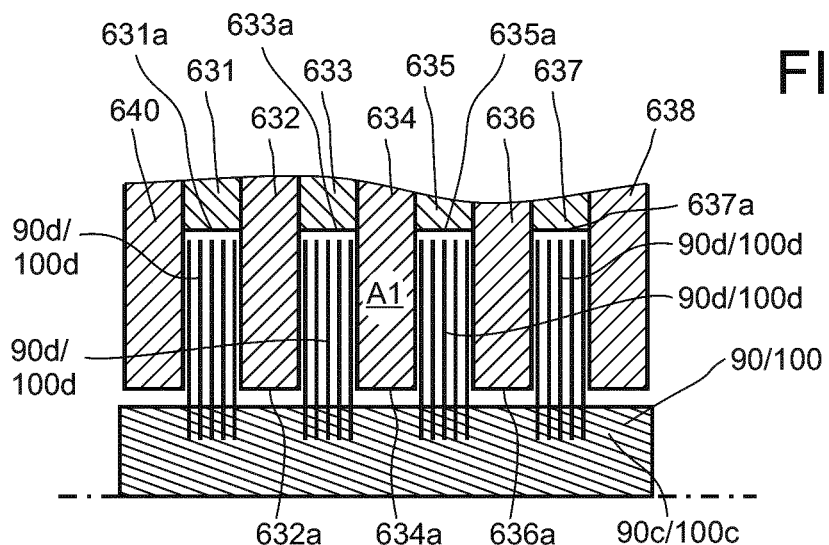
Figure 10H:
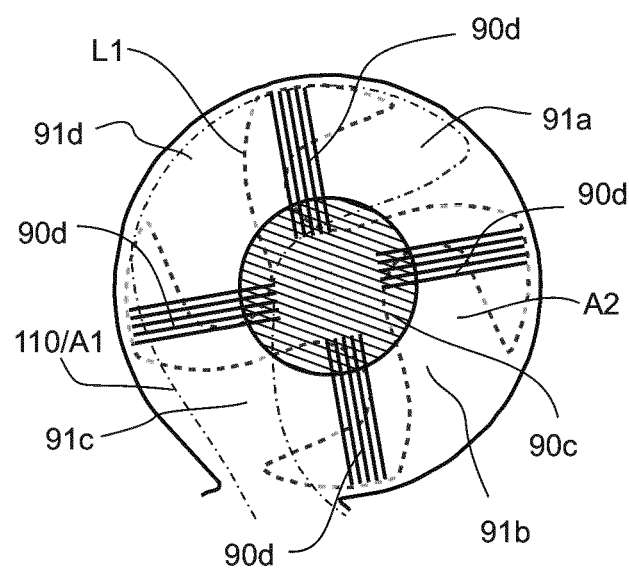

A further alternative embodiment (with regard to FIG. 10E) is shown in FIG. 10G wherein the guidance wheel 90 and/or closing wheel 100 consists of a wheel body 90c/100c and fibrous resilient bristles 90d/100d (flexible enough to move if in contact with the body, but stable enough to take the seed safely). The bristles 90d/100d may be attached to the wheel body 90c/100c by bonding or by in-mould forming (whereby bristles 90d/100d are inserted into the tool before moulding body 90c/100c). Similar to FIG. 10E, in a first area A1 the inner contours 631a-637a form the counterpart to this basset shape of bristles 90d/100d so that the alternate plates 632, 634, 636, enclosing plates 638, 640 and guidance wheel 90 or closing wheel 100 are in intermeshed relationship and able to move relative to each other. Further similar to FIG. 10F, but not shown in detail, in a second area the inner contours 631a-637a (enclosed by plates 638, 640) form seed channel 110 and placement chamber 120 in which bristles 90d/100d of guidance wheel 90 or closing wheel 100 can move the seed taken by rotation of guidance wheel 90 or closing wheel 100. FIG. 10H shows, for guidance wheel 90 only (although closing wheel 100 may be similarly constructed), that four bristles 90d are arranged at the circumference of wheel body 90c at an offset angle of 90° and in radial direction so that, similar to guidance wheel 90 shown in FIG. 5C (schematically depicted herein with line L1), four seed chambers 91a-91d are provided to carry the seed inside seed channel 110. The bristles 90d may thereby extend with an angle to radial direction to ensure that the seed is moved radially outwards. This embodiment has the advantage that the (small) flexibility of bristles 90d provides a smoother seed guidance and allows for tolerances in the comb-shaped profile.

Figure 10I:
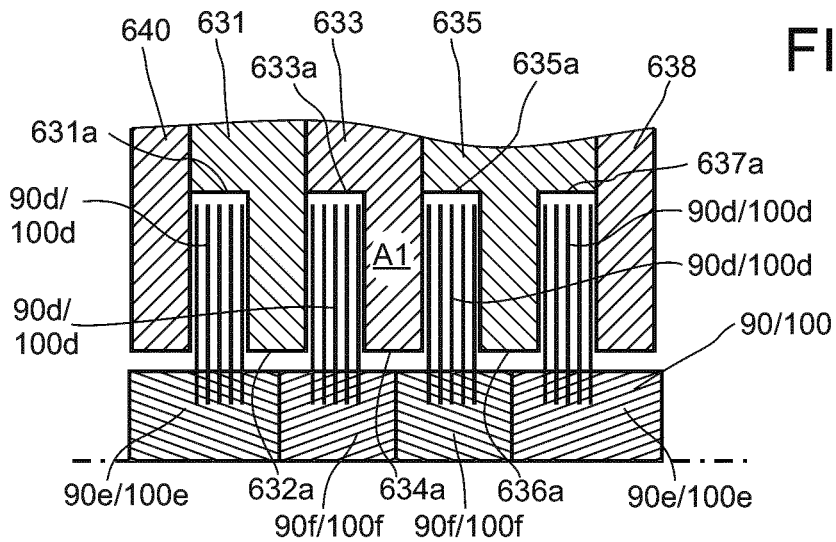

In a further embodiment shown with FIG. 10I, the body 60 may comprise a reduced number of plates 631, 633, 635, whereby plate 631 (merged with plate 632 shown in FIGS. 10E to 10G) provides both contours 631a, 632a, plate 633 (merged with plate 634 shown in FIGS. 10E to 10G) provides both contours 633a, 634a and plate 635 (merged with plates 636 and 637 shown in FIGS. 10E to 10G) provides the contours 635a, 636a and 637a. Instead of using sheet metal plates as shown in FIGS. 10E to 10G, plates 631, 633, 635 may then be produced by moulding, casting or machining to enable the non-flat design with local indentations. This reduces parts costs and assembly time at the expense of tooling costs compared to the stacked plate arrangement.

In a further embodiment, the guidance wheel 90 and/or closing wheel 100 may consist of multiple wheel body parts 90e/100e, 90f/100f stacked together, each having attached bristles 90d/100d. If each of plates 631, 633, 635 may be a single part extending over complete circumference of body 60, neither guidance wheel 90 nor closing wheel 100 can be plugged through a complete plate 631 having inner contours 632a, but having multiple and detachable wheel bodies 90e/100e, 90f/100f enables a synchronous stacking of plates 631, 633, 635. The order of assembly is generally in the left-to right direction with reference to FIG. 10I and may have the following steps:
  1. The stacking assembly starts with enclosing plate 640 resting on a horizontal base.
  2. First wheel body 90e/100e (on left side in FIG. 10I) is assembled.
  3. Plate 631 is then stacked with the contour 631a encompassing the bristles 90d/100d of the previously mounted first wheel body 90e/100e.
  4. Second wheel body 90f/100f is assembled next.
  5. Plate 633 is then stacked with the contour 633a encompassing the bristles 90d/100d of the previously mounted second wheel body 90e/100e.

6. Third wheel body 90*f*/100*f* is assembled next.
7. Plate 635 is then stacked with the contour 635*a* encompassing the bristles 90*d*/100*d* of the previously mounted second wheel body 90*f*/100*f*.
8. Fourth wheel body 90*e*/100*e* is assembled next (in opposite orientation compared to First wheel body 90*e*/100*e* in step 2) into the contour 637*a* in the previously mounted plate 635.
9. The stacking assembly for section 630 is then finished with enclosing plate 640 mounted on top of the stack.

It is envisaged that the stacking assembly requires the stacked parts to be impeded against loosening or relative rotation (especially the assembly guidance wheel 90 or closing wheel 100) and furthermore requires means to enable correct positioning during assembly. This may be provided in known manner by screws, pins or matching contours e.g. when moulded parts are used.

FIG. 10D shows an overall exploded view of the three sections 610, 620, 630. As can be seen (also in FIG. 9), between sections 620 and 630 a separating plate 640 is provided to separate the chambers of the two sections which is necessary to enable lubrication to be applied to the components of sections 610 and 620 without lubricant contamination impacting seeds in section 630.

Although shown in FIG. 10 as two sets of similar plate designs, there may be variations between plates of generally the same design to provide further advantage of the structure 600 as shown in FIGS. 4 to 6 and 11. At the edge where the rotating body 60 engages the ground to generate an opening or trench to receive a seed, a wedge 700 is formed by the plates 631-637 having a varying outer contour at this edge, which wedge improves the cutting action and reduces the energy required to generate the opening. The construction technique producing the body 60 enables the building of a wedge just from a staircase profile of stacked plates, as shown in FIG. 11A, rather than requiring expensive, three dimensional machining of a body outer shell. However, this staircase profile may be machined to a continuous slope or curved profile as illustrated respectively at 700A and 700B in FIG. 11B.

As mentioned above, transfer unit 56 receives the individual seeds from the (pneumatic) sorting/singling unit 55 and feeds them alternately into one of a pair of seed channels 111, 121 in the seed placement unit 52, when the seed placement unit 52 is at a particular predetermined point in its rotation. A problem with the (pneumatic) sorting/singling unit 55 is that the delivery frequency is indeed synchronized with rotation of the seed placement unit 52 but, as seeds may be different of size, weight and shape, the synchronization may show deviations which may result in failures during seed transfer from sorting/singling unit 55 to seed placement unit 52. This problem is addressed with the following embodiment described with reference to FIGS. 12 to 21.

In the further embodiment, the transfer unit 56 comprises a fixed transfer body 800 attached to mounting brackets 46 and a rotating transfer body 900 which rotates relative to the fixed transfer body 800 about a device axis indicated at 61. The rotating transfer body 900 rotates with seed sorting and placement unit 28 by attachment to body 60. The direction of rotation of the transfer body 900 is indicated by arrow R.

The fixed transfer body 800 and the rotating transfer body 900 form a closed annular cavity in which the seed is transported from inlet to outlet, which annular cavity includes an arrangement of ribs or ridges protruding from the plates forming the respective transfer bodies to receive, guide and ultimately eject a seed, as described in further detail below.

Figure 12:
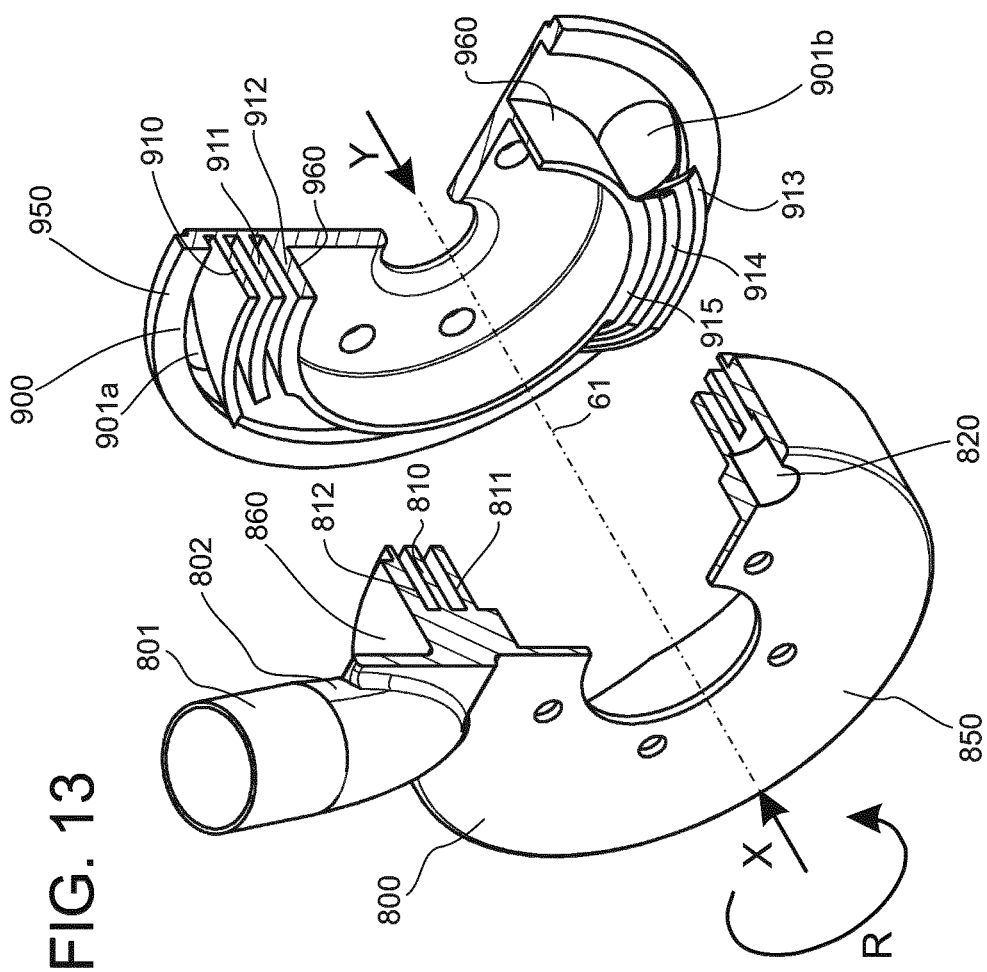
FIG. 12 is a perspective view of the transfer unit of FIG. 4.
Figure 13:
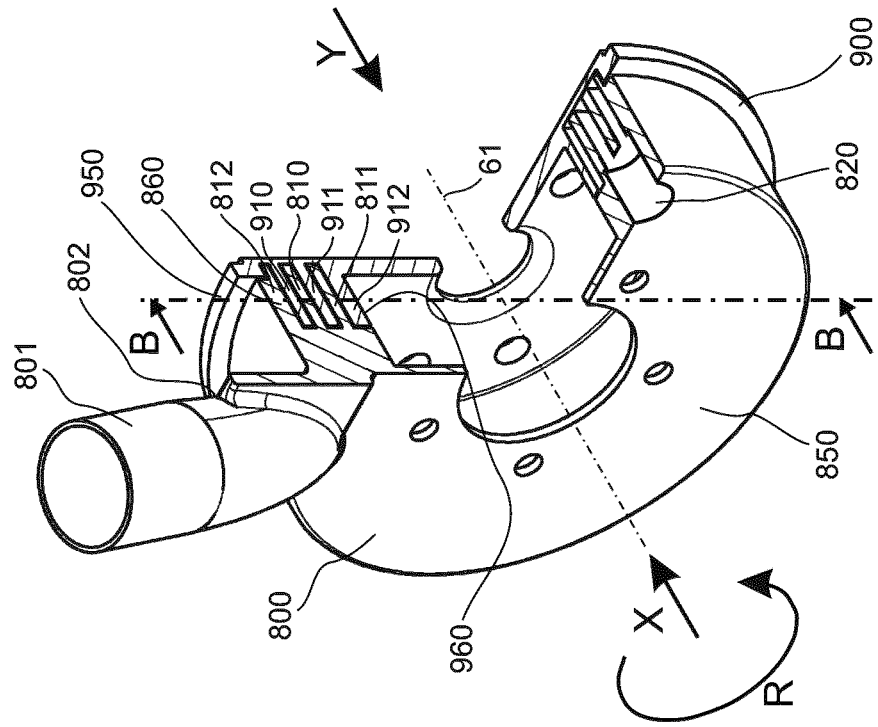
FIG. 13 is a perspective, exploded view of the transfer unit of FIG. 12.

With reference to FIGS. 12 and 13, the fixed transfer body 800 is provided with a port 801 for connection between the pneumatic sorting/singling unit 55 and a seed inlet aperture 802 (FIG. 14) to the annular cavity. The rotating transfer body 900 is provided with first seed outlet 901*a* and second seed outlet 901*b* which are arranged at an offset angle of 180° about device axis 61, which outlets align with the seed channels 110,111 in body 60.

In order to guide the seed, the fixed transfer body 800 and the rotating transfer body 900 are provided with arcuate or part-circular ridges 810, 811, 812 and 910, 911, 912, 913, 914, 915 in an intersecting comb arrangement to form a pectinated seed guidance contour as explained below.

Figure 14:
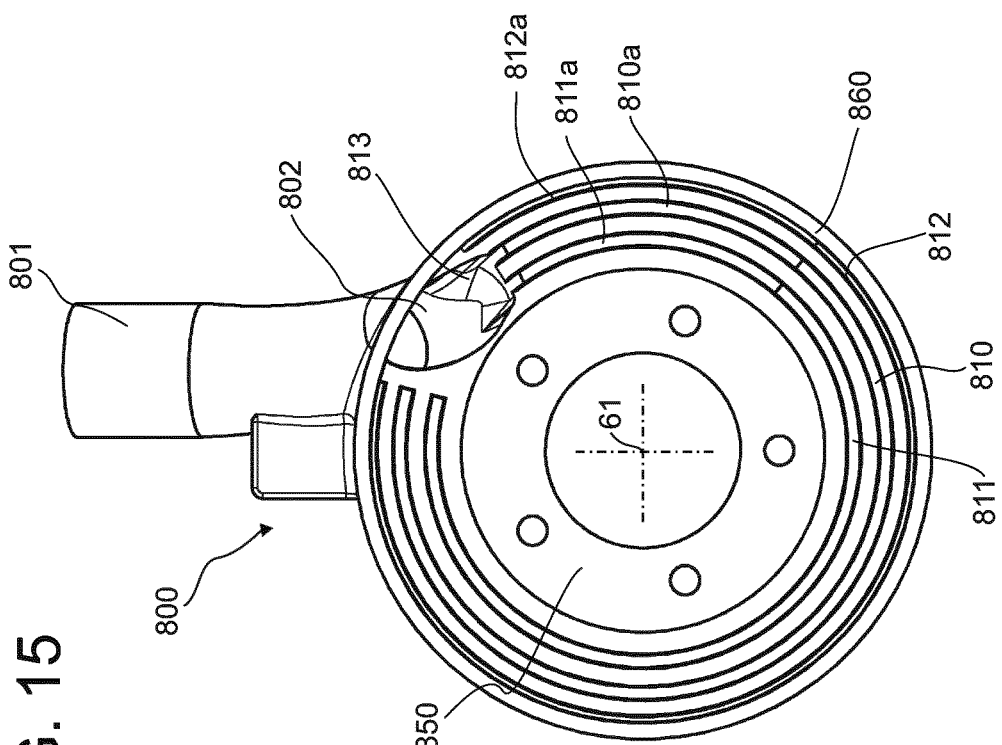
FIG. 14 is a perspective view of the fixed transfer body shown in FIG. 13.
Figure 15:
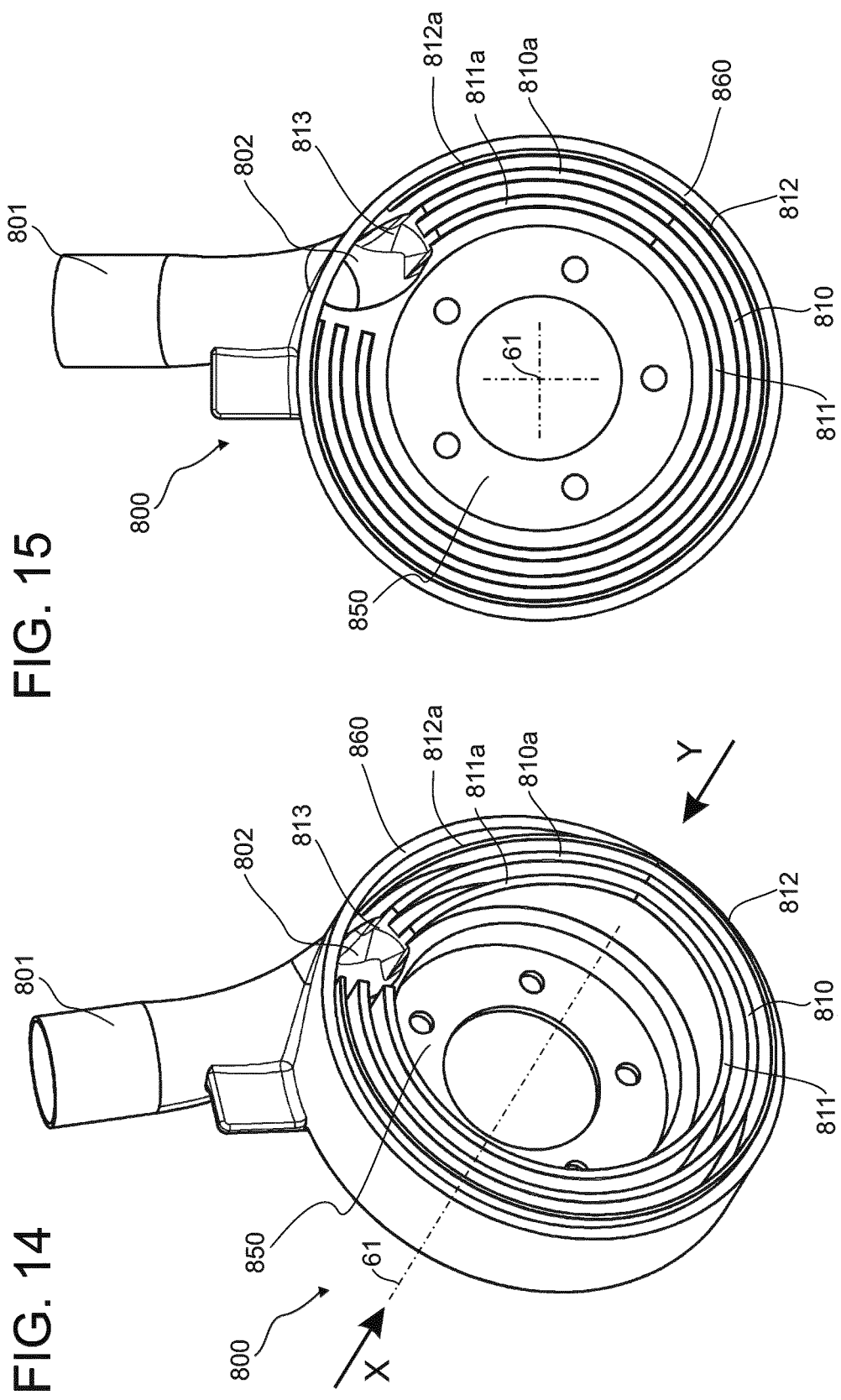
FIG. 15 is a view of the fixed transfer body in a direction indicated with arrow Y shown in FIG. 14.

With reference to FIGS. 14 and 15, the fixed transfer body 800 comprises a top wall or plate 850 provided with bores for screw attachment to the mounting bracket 46 and the components (not shown) to rotate the seed sorting and placement unit 28. Perpendicular to the top wall 850, a cylindrical (circular cross-section) outer side wall 860 extends from the periphery (circumferential edge) of top wall 850 in the direction of device axis 61. The top wall 850 and outer side wall 860 form the L-shaped outer geometry of fixed transfer body 800. Radially offset from, and within, outer side wall 860, three spaced apart circular ridges 810, 811, 812 are provided, with the outermost ridge 812 being partly merged with outer side wall 860. As can be seen, the arcuate ridges 810, 811, 812 have an interruption 813 in the vicinity of seed inlet aperture 802 to enable a seed to enter the annular cavity. For precise guidance of the seed, the ridges 810, 811, 812 are provided with chamfers 810*a*, 811*a*, 812*a* to smoothly increase height starting from the level of the plate or side wall 850 at the seed inlet aperture 802, up to the level of the top wall 860, that is to say increasing in height in the opposite direction to that indicated by arrow Y in the Figures.

With reference to FIGS. 16 and 17, rotating transfer body 900 comprises a bottom wall 950 provided with bores for screw attachment to the seed sorting and placement unit 28. Perpendicular to bottom wall 950, a cylindrical (circular cross-section) inner side wall 960 extends from the bottom wall 950 in the direction of device axis 61. The bottom wall 950 and inner side wall 960 form the L-shaped outer geometry of the rotating transfer body 900. When assembled (aligned on device axis 61) the L-shaped outer geometry of rotating transfer body 900 forms the closed annular cavity with the inverted L-shaped outer geometry of fixed transfer body 800.

Radially offset from, and outside, inner side wall 960, spaced groups of arcuate ridges 910, 911, 912, 913, 914, 915 are provided. The first group of arcuate ridges 910, 911, 912 are arranged radially spaced from each other in a first radial segment of the annular cavity in the vicinity of a first seed outlet 901*a* extending through the bottom wall 950, with ridge 912 being partly merged with inner side wall 960. At an offset angle of 180° about device axis 61, in a second radial segment in the vicinity of a second seed outlet 901*b*, arcuate ridges 913, 914, 915 are arranged radially spaced from each other, with ridge 914 being partly merged with inner side wall 960.

As best seen in FIG. 17, each of the arcuate ridges 910, 911, 912, 913, 914, 915 partially overlaps with the respective seed outlets 901*a*, 901*b* at a first circumferential end of the ridge. To enable the seeds to pass through seed outlet 901*a* along ridges 910, 911, 912, cut-outs (or reverse chamfers) 910*a*, 911*a*, 912*a* are provided which extend outwardly from the edge of seed outlet 901*a*, in direction opposite to arrow X, to the overlapping first circumferential end of the respective ridge, such that a seed encountering the cut-outs 910a, 911a, 912a as the transfer bodies rotate relative to one another will be pushed towards the bottom wall or plate 950 and ejected through the outlet 901a. A matching arrangement is provided to enable the seeds to pass through seed outlet 901b under the guidance of ridges 913, 914, 915 and cut-outs 913a, 914a, 915a. The second circumferential end of arcuate ridges 910, 911, 912, 913, 914, 915 are provided with chamfers 910b, 911b, 912b, 913b, 914b, 915b to smoothly increase height in starting from the level of the bottom wall 960 up to full height in the opposite direction to that indicated by arrow X, such that each of the ridges 910, 911, 912, 913, 914, 915 has a generally parallelogram form.

Figure 18:
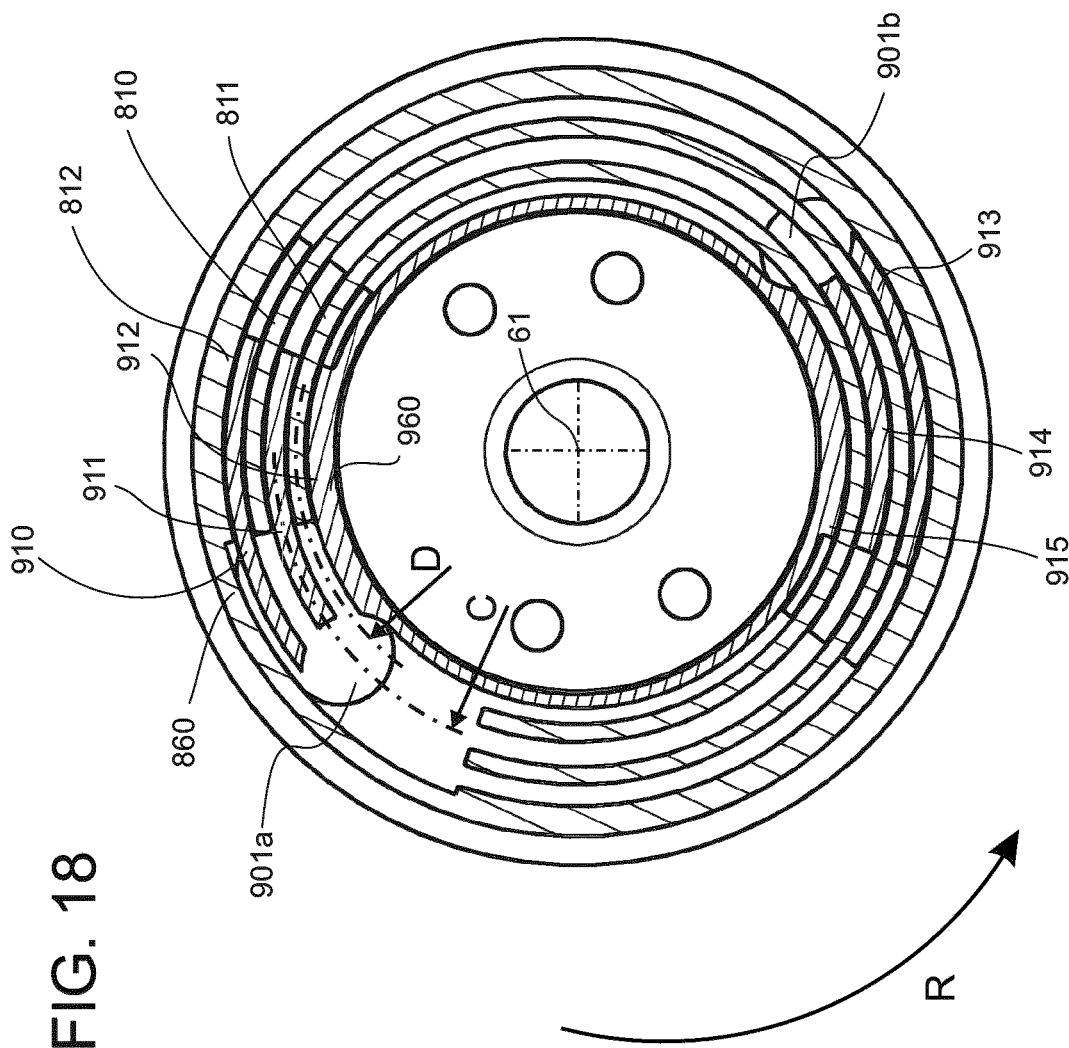
FIG. 18 is a view of section B-B shown in FIG. 12.

As best seen with FIGS. 12, 13 and 18, outer side wall 860 (including ridge 812), ridge 910, ridge 810, ridge 911, ridge 811 and inner side wall 960 (including ridge 912) engage closely with each other to form a pectinated seed guidance contour.

The guidance of the seeds is now explained with reference to FIGS. 19, 20 and 21. FIG. 19 shows a section as indicated with dotted line C-C in FIG. 18 through one of the ridges 911, 914 in the rotating transfer body 900. FIG. 19 shows a section as indicated with dotted line D-D in FIG. 18 through one of the ridges 811 in the fixed transfer body 800. The sections C-C and D-D are circular sections shown for a 360° turn, so that the start and end of each section coincide. In FIG. 21 both sections C-C and D-D are schematically depicted in one drawing layer.

The Figures show ridges 911 and 914 of the rotating transfer body 900 which are moving in between the ridges 810 and 811 (811 not shown) of the fixed transfer body 800 by rotation in direction R. A seed (indicated at S.5) is entering through inlet aperture 802 into the transfer unit 56 and is then taken by one of ridges 911 and 914 which are separated from each other. When the seed S.5 is moved by the contour provided by cut-outs 911a, 914a towards chamfer 810a, S.5 is pushed upwards and forced to leave the transfer unit 56 through seed outlet 901a, 901b.

As the ridges 911 and 914 are 180° offset from each other, a seed transfer area STA is provided in the space defined by top wall 850 of fixed transfer body 800, bottom wall 950 of rotating transfer body 900, cut-outs 914a and chamfers 911b, in which a seed is always taken by ridge 914. When moving towards chamfer 811a, the seed transfer area STA is continuously reduced in size by the chamfer to force the seed through the respective outlet. As the seed transfer area STA is very long (each STA covering 90° or more of the rotation), a newly-delivered seed S.6 coming from the pneumatic sorting/singling unit 55 through inlet aperture 802 is safely transferred even when there are deviations from the predetermined delivery rate.

In a further embodiment, the transfer unit 56 is provided with a means to discharge air coming with seeds from the pneumatic sorting/singling unit 55. To achieve this, the top wall 850 of the fixed transfer body 800 is provided with a de-aeration opening or vent 820 which is partly covered by ridges 810, 811 so that air may be exhausted but seeds cannot leave through it. Ideally, the de-aeration opening or vent 820 may be spaced apart from inlet aperture 802 so that the air can take the seeds first and then be exhausted.

In the foregoing the applicants have described a seed transfer unit for an agricultural planter, which comprises first and second transfer bodies 800, 900, with each comprising a plate 850, 950 with a cylindrical sidewall 860, 960 extending perpendicularly. The first and second plates 850, 950 are mounted to permit relative rotation therebetween about a device axis 61 coincident with the major axes through the first and second cylindrical side walls 860, 960, with the first and second plates 850, 950 parallel, and with the second cylindrical side wall 960 disposed within, and concentric with, the first cylindrical side wall 860, such that the first and second plates 850, 950 and first and second cylindrical side walls 860, 960 define an annular space therebetween. The first plate 850 has an inlet aperture 802 through which a seed may pass to the annular space, and the second plate 950 has at least one outlet aperture 901a, 901b through which a seed is ejected. Each of the first and second plates 850, 950 has at least one arcuate ridge portion 810, 811, 812, 910, 911, 912, 913, 914, 915 concentric with the respective cylindrical side wall 860, 960 and extending into the annular space, which ridge portions 810, 811, 812, 910, 911, 912, 913, 914, 915 cooperate to carry a seed through the annular space from the inlet aperture 802 to the, or one of the, outlet apertures 901a, 901b as the first and second plates 850, 950 rotate relative to one another.

From reading the present disclosure, other modifications will be apparent to persons skilled in the art. Such modifications may involve other features which are already known in the field of agricultural machines and component parts thereof and which may be used instead of or in addition to features already described herein, and the scope of the invention is limited only by the following claims.

The invention claimed is:

1. A seed transfer unit for an agricultural planter, comprising:
  a first transfer body comprising a first plate with a first cylindrical sidewall extending perpendicularly from the first plate;
  a second transfer body comprising a second plate with a second cylindrical sidewall extending perpendicularly from the second plate;
  wherein the first and second plates are mounted to permit relative rotation therebetween about a device axis coincident with a major axes through the first and second cylindrical side walls, with the first and second plates parallel, and with the second cylindrical side wall disposed within, and concentric with, the first cylindrical side wall, such that the first and second plates and first and second cylindrical side walls define an annular space therebetween;
  wherein the first plate has an inlet aperture through which seed may pass to the annular space, and the second plate has at least one outlet aperture through which seed is ejected from the annular space; and
  wherein each of the first and second plates has at least one arcuate ridge portion concentric with the respective first and second cylindrical side walls and extending into the annular space, wherein the at least one arcuate ridge portions cooperate to carry seed through the annular space from the inlet aperture to the at least one outlet aperture as the first and second plates rotate relative to one another.

2. The seed transfer unit as claimed in claim 1, wherein each of the first and second plates have a plurality of the at least one arcuate ridge portions arranged in interlocking pectinated manner in the annular space.

3. The seed transfer unit as claimed in claim 1, wherein each of the at least one arcuate ridge portions of the first plate is terminated in the vicinity of the inlet aperture.

4. The seed transfer unit as claimed in claim 3, wherein each of the at least one arcuate ridge portions of the first plate have a chamfered portion in which the height of the ridge increases with distance from the inlet aperture.

5. The seed transfer unit as claimed in claim 1, wherein each of the at least one arcuate ridge portions of the second plate have at least one discontinuous portion defining a gap to receive seed.

6. The seed transfer unit as claimed in claim 5, wherein each of the at least one arcuate ridge portions of the second plate have a chamfered portion in which the height of the ridge increases with distance from the gap.

7. The seed transfer unit as claimed in claim 5, wherein each of the at least one arcuate ridge portions of the second plate have a downwardly-chamfered portion at least partially overlapping each at least one outlet aperture, in which the depth of the ridge increases towards the second plate with increasing distance from the gap.

8. The seed transfer unit as claimed in claim 1, wherein the second plate has two or more outlet apertures regularly radially spaced with respect to the device axis.

9. The seed transfer unit as claimed in claim 1, wherein at least one of the first and second plates has an aeration vent in the vicinity of the inlet aperture.

10. The seed transfer unit as claimed in claim 9, wherein the aeration vent is blocked to the passage of seeds by the one or more arcuate ridge portions of the first or second transfer bodies.

11. A seed placement device comprising a chassis and transport means to carry the chassis across ground, including the seed transfer unit of claim 1.

12. The seed placement device as claimed in claim 11, further comprising a rotating seed placement unit coupled to receive seeds ejected from the at least one outlet aperture of the seed transfer unit, and configured to plant the same.

\* \* \* \* \*